(12) United States Patent
Chiu et al.

(10) Patent No.: US 10,846,965 B2
(45) Date of Patent: Nov. 24, 2020

(54) IMAGE CAPTURING APPARATUS

(71) Applicant: Gingy Technology Inc., Hsinchu (TW)

(72) Inventors: Yi-Feng Chiu, Hsinchu (TW);
Chiung-Han Wang, Hsinchu (TW);
Jen-Chieh Wu, Hsinchu (TW)

(73) Assignee: Gingy Technology Inc., Hsinchu (TW)

( * ) Notice: Subject to any disclaimer, the term of this patent is extended or adjusted under 35 U.S.C. 154(b) by 13 days.

(21) Appl. No.: 16/454,087

(22) Filed: Jun. 27, 2019

(65) Prior Publication Data

US 2020/0005567 A1 Jan. 2, 2020

Related U.S. Application Data

(60) Provisional application No. 62/691,631, filed on Jun. 29, 2018, provisional application No. 62/728,079, filed on Sep. 7, 2018.

(30) Foreign Application Priority Data

Sep. 19, 2018 (TW) .............................. 107132958 A

(51) Int. Cl.
| | | |
|---|---|---|
| *G06K 9/00* | (2006.01) | |
| *G07C 9/37* | (2020.01) | |
| *G02B 27/09* | (2006.01) | |
| *G06K 9/20* | (2006.01) | |

(52) U.S. Cl.
CPC ............ *G07C 9/37* (2020.01); *G02B 27/0955* (2013.01); *G06K 9/2018* (2013.01); *G07C 2209/65* (2013.01)

(58) Field of Classification Search
CPC .. G07C 9/37; G07C 2209/65; G02B 27/0955; G06K 9/2018

USPC ........................................................ 382/115
See application file for complete search history.

(56) References Cited

U.S. PATENT DOCUMENTS

| | | | | |
|---|---|---|---|---|
| 4,728,186 A * | 3/1988 | Eguchi | ..................... | G02B 6/26 |
| | | | | 356/71 |
| 6,381,347 B1 * | 4/2002 | Teng | .................. | G06K 9/00046 |
| | | | | 382/127 |
| 7,903,847 B2 * | 3/2011 | Higuchi | ............ | G06K 9/00006 |
| | | | | 382/126 |
| 8,170,301 B2 * | 5/2012 | Higuchi | ............... | A61B 5/1172 |
| | | | | 382/126 |
| 8,233,149 B2 | 7/2012 | Kishima | | |

FOREIGN PATENT DOCUMENTS

| | | |
|---|---|---|
| TW | I533020 | 5/2016 |
| TW | I563286 | 12/2016 |

* cited by examiner

*Primary Examiner* — Jonathan S Lee
(74) *Attorney, Agent, or Firm* — JCIPRNET

(57) ABSTRACT

An image capturing apparatus including a cover plate, a first lens element and a second lens element arranged sequentially from an object side to an image side along an optical axis is provided. The number of lens elements in the image capturing apparatus is only two. The image capturing apparatus satisfies: 0.2<f/imgH<0.9, 2.9<N1+N2<3.7, and 2<(OTL−d)/imgH<8, wherein f is an effective focal length of the image capturing apparatus, imgH is a maximum imaging height of the image capturing apparatus, N1 is a refractive index of the first lens element, N2 is a refractive index of the second lens element, OTL is a distance from a tested object to an imaging plane on the optical axis, and d is a thickness of the cover plate.

10 Claims, 24 Drawing Sheets

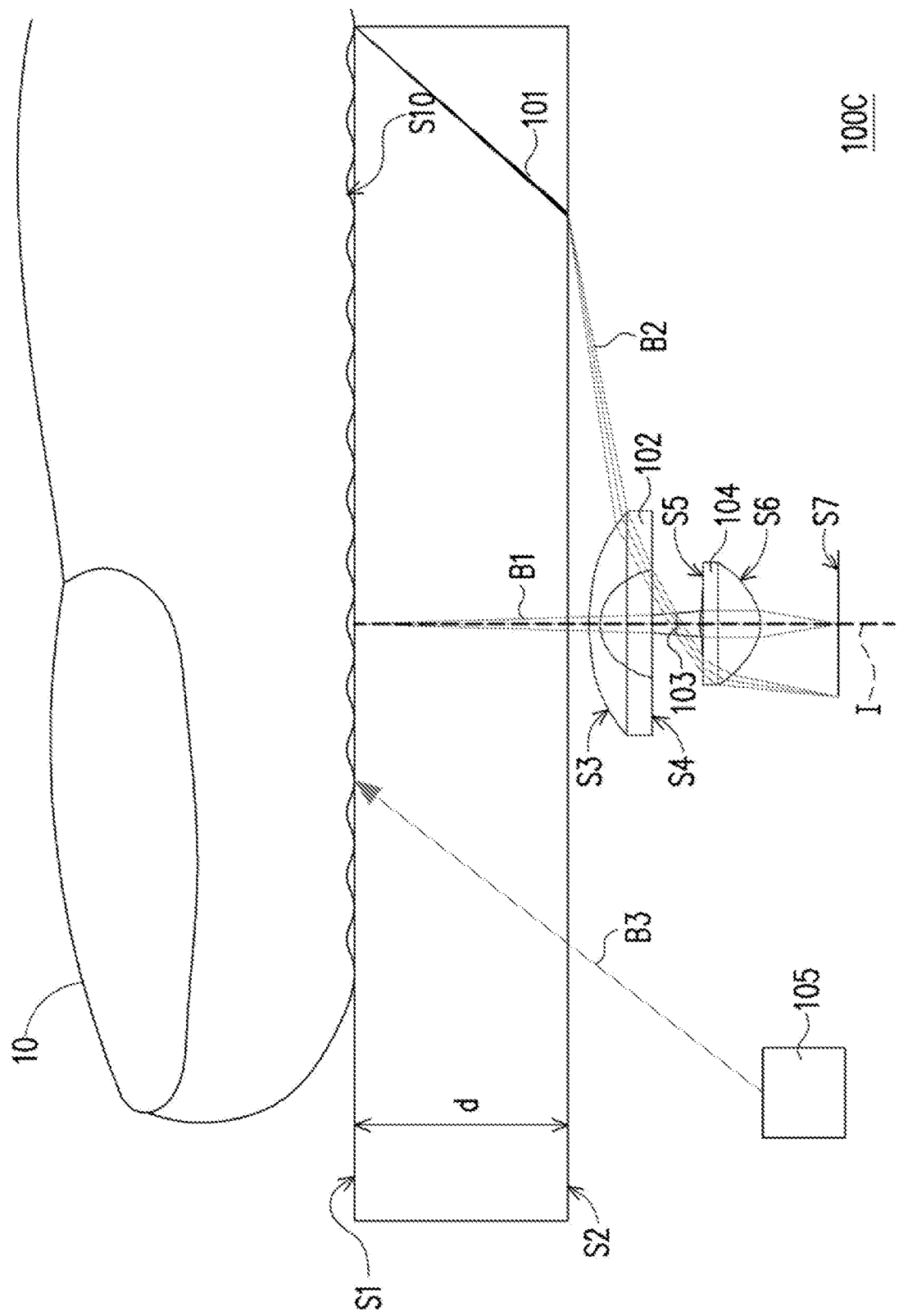

Spherical aberration

Focal length shift amount (mm)

Field curvature
imgH (mm)

Focal length shift amount (mm)

Distortion
imgH (mm)

Distortion rate (%)

IMAGE CAPTURING APPARATUS

CROSS-REFERENCE TO RELATED APPLICATION

This application claims the priority benefits of U.S. provisional application Ser. No. 62/691,631, filed on Jun. 29, 2018, and U.S. provisional application Ser. No. 62/728,079, filed on Sep. 7, 2018, and Taiwan application serial no. 107132958, filed on Sep. 19, 2018. The entirety of each of the above-mentioned patent applications is hereby incorporated by reference herein and made a part of this specification.

BACKGROUND

Technical Field

The disclosure relates to an electronic device, and particularly relates to an image capturing apparatus.

Description of Related Art

Conventional electronic devices mainly use a capacitive sensing technology to implement biological feature recognition (such as fingerprint recognition, palm print recognition or vein recognition, etc.). Although the capacitive sensing technology has an advantage of small volume, its complicated circuit structure leads to manufacturing difficulty and high manufacturing cost, resulting in high unit price of the electronic device and difficulty in popularization. At present, although some electronic devices use optical imaging technology to perform biological feature recognition, the existing optical imaging system is too large in volume, so that the electronic devices are not easy to be miniaturized and thinned, which reduces portability of the electronic devices. Therefore, how to reduce the volume of the optical imaging system in the electronic devices while maintaining good optical imaging quality has become a focus of current research and development.

SUMMARY

The disclosure is directed to an image capturing apparatus, which is capable of maintaining good imaging quality while achieving a thinning effect.

The disclosure provides an image capturing apparatus including a cover plate, a first lens element and a second lens element arranged sequentially from an object side to an image side along an optical axis. The number of lens elements in the image capturing apparatus is only two. The image capturing apparatus satisfies: $0.2<f/imgH<0.9$, $2.9<N1+N2<3.7$, and $2<(OTL-d)/imgH<8$, wherein f is an effective focal length of the image capturing apparatus, imgH is a maximum imaging height of the image capturing apparatus, N1 is a refractive index of the first lens element, N2 is a refractive index of the second lens element, OTL is a distance from a tested object to an imaging plane on the optical axis, and d is a thickness of the cover plate.

In an embodiment of the disclosure, the first lens element and the second lens element respectively have a negative refractive power and a positive refractive power. The first lens element and the second lens element each have an object side surface and an image side surface. The object side surface of the first lens element, the image side surface of the first lens element, the object side surface of the second lens element and the image side surface of the second lens surface are all aspheric surfaces. The image capturing apparatus further includes an aperture, and the aperture is located between the first lens element and the second lens element.

In an embodiment of the disclosure, an f-number of the image capturing apparatus is smaller than 3.7.

In an embodiment of the disclosure, the image capturing apparatus further satisfies: $(OTL-d)<3.5$ mm.

In an embodiment of the disclosure, the image capturing apparatus further satisfies: $35<V1+V2<65$, wherein V1 is a dispersion coefficient of the first lens element, and V2 is a dispersion coefficient of the second lens element.

In an embodiment of the disclosure, the image capturing apparatus further satisfies: $0.6<|f/f1|+|f/f2|<1.7$, wherein f1 is a focal length of the first lens element, and f2 is a focal length of the second lens element.

In an embodiment of the disclosure, the image capturing apparatus further satisfies: 100 degrees$<FOV<$180 degrees, wherein FOV is a field of view of the image capturing apparatus.

In an embodiment of the disclosure, a distance from the image side surface of the second lens element to the imaging plane on the optical axis is greater than or equal to 0.4 mm.

In an embodiment of the disclosure, the image capturing apparatus further includes a light source. The light source is disposed under the cover plate, and a wavelength of the light source is between 400 nm and 600 nm.

In an embodiment of the disclosure, the cover plate includes a finger pressing plate, a display panel, a touch display panel or a combination of at least two of the above.

Based on the above, the image capturing apparatus of the embodiment of the disclosure has following advantages. Through an optical parameter design and arrangement of the cover plate and the two lens elements, the image capturing apparatus may still have an optical performance capable of effectively overcoming aberration while reducing a thickness. Therefore, the image capturing apparatus maintains good image quality while achieving the thinning effect.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

FIG. 7 is a schematic diagram of an image capturing apparatus according to a fourth embodiment of the disclosure.

DESCRIPTION OF THE EMBODIMENTS

Directional terminology mentioned in the following embodiments, such as "top," "bottom," "left," "right," "front," "back," etc., is used with reference to the orientation of the FIG(s) being described and are not intended to limit the disclosure. In the FIGs, each of the drawings depicts typical features of methods, structures, and/or materials used in the particular exemplary embodiments. However, these drawings are not to be interpreted as limiting or limiting the scope or property covered by these exemplary embodiments. For example, for clarity, relative thickness and position of each film layer, region and/or structure may be reduced or enlarged.

In the following embodiments, the same or similar components are denoted by the same or similar referential numbers, and descriptions of the same technical contents are omitted. Moreover, the features in the different exemplary embodiments may be combined with each other in case of no confliction, and the simple equivalent changes and modifications made in accordance with the scope of the specification or the claims are still within the scope of the patent. Furthermore, "first", "second", etc. mentioned in the specification and the claims are merely used to name discrete components and should not be regarded as limiting the upper or lower bound of the number of the components, nor is it used to define a manufacturing order or setting order of the components.

In the following embodiments, each image capturing apparatus is suitable for capturing biological features of a tested object. For example, when the tested object is a finger, the biological features may be fingerprints or veins. When the tested object is a palm, the biological features may be palm prints.

Figure 1:
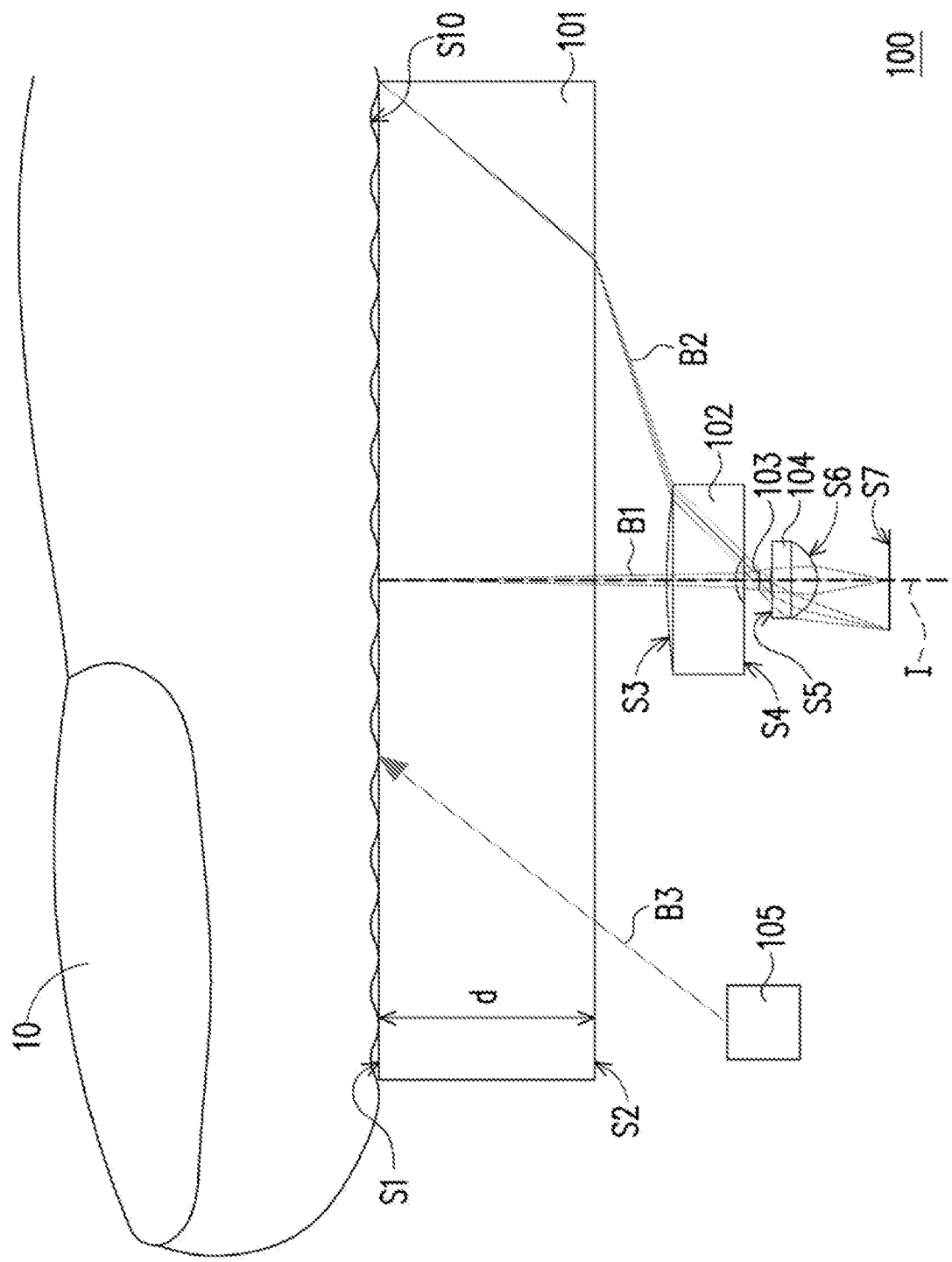
FIG. 1 is a schematic diagram of an image capturing apparatus according to a first embodiment of the disclosure.

FIG. 1 is a schematic diagram of an image capturing apparatus according to a first embodiment of the disclosure. Referring to FIG. 1, the image capturing apparatus 100 of the first embodiment of the disclosure includes a cover plate 101, a first lens element 102, an aperture 103 and a second lens element 104 arranged sequentially from an object side to an image side along an optical axis I. The object side is a side where a tested object 10 is located, and the image side is a side where an imaging plane S7 is located. In the disclosure, the imaging plane S7 is a sensing surface of a sensor (not shown) in the image capturing apparatus 100. When an imaging beam (i.e. a beam with biological feature information, such as an imaging beam B1 and an imaging beam B2) coming from the tested object 10 enters the image capturing apparatus 100, the imaging beam sequentially passes through the cover plate 101, the first lens element 102, the aperture 103 and the second lens element 104, and then forms an image on the imaging plane S7.

The cover plate 101, the first lens element 102 and the second lens element 104 each include an object side surface (for example, object side surfaces S1, S3 and S5) and an image side surface (for example, image side surfaces S2, S4 and S6). The object side surfaces are surfaces facing the object side (or the tested object 10) and allowing the imaging beam to pass through, while the image side surfaces are surfaces facing the image side (or the imaging plane S7) and allowing the imaging beam to pass through.

The cover plate 101 is adapted to protect components located thereunder. In the embodiment, the cover plate 101 is a finger pressing plate. When performing the biological feature recognition, the object side surface S1 of the cover plate 101 is a surface contacting the tested object 10. Namely, the tested object 10 contacts the object side surface S1 of the cover plate 101 to implement biological feature recognition. The finger pressing plate may include a light transmissive or semi-transmissive main body to facilitate transmission of the imaging beam to the sensor. The main body may include a glass plate, a plastic plate or a combination thereof, but the disclosure is not limited thereto. Moreover, the finger pressing plate may selectively include a decoration layer, and the decoration layer is disposed on the cover plate 101 to shield components thereunder from being viewed.

In another embodiment, the cover plate 101 may include a finger pressing plate, a display panel, a touch display panel or a combination of at least two of the above. For example, the cover plate 101 may be a display panel, such as an organic light-emitting display panel, but the disclosure is not limited thereto. Alternatively, the cover plate 101 may be a touch display panel, such as an organic light-emitting display panel with a plurality of touch sensing electrodes. The touch sensing electrodes may be formed on an outer surface of the organic light-emitting display panel or embedded in the organic light-emitting display panel, and the touch sensing electrodes may be used for touch detection by means of self-capacitance or mutual capacitance. Alternatively, the cover plate 101 may be a combination of a finger pressing plate and a display panel or a combination of a finger pressing plate and a touch display panel.

Furthermore, when the image capturing apparatus 100 and a liquid-crystal display (including a liquid-crystal display panel and a backlight module) are integrated, the cover plate 101 may be disposed on top of the liquid-crystal display panel, or a counter substrate in the liquid-crystal display panel may serve as the cover plate 101 of the image capturing apparatus 100. An opening used for accommodating an optical imaging system (including the first lens element 102, the second lens element 104 and a sensor) may be formed in the liquid-crystal display. The backlight module is located under the liquid-crystal display panel to provide an illumination beam. In order to prevent the illumination beam emitted from the backlight module from being directly transmitted to the sensor, a light-shielding structure may be formed between the backlight module and the optical imaging system to maintain ideal imaging quality. Under the above structure, a plurality of touch sensing electrodes may be further configured to provide a touch detection function.

The first lens element 102 is adapted to enlarge a field of view (FOV) of the image capturing apparatus 100, such that the sensor of the image capturing apparatus 100 may capture a larger image range. In the embodiment, the first lens element 102 has a negative refractive power. Moreover, the object side surface S3 of the first lens element 102 is convex near the optical axis, and the image side surface S4 of the first lens element 102 is concave near the optical axis. The first lens element 102 may be made of a plastic material to satisfy a demand of lightweight, but the disclosure is not limited thereto.

The aperture 103 is adapted to reduce stray light to improve image quality. In the embodiment, the aperture 103 is disposed between the first lens element 102 and the second lens element 104, which avails enlarging the FOV, such that the image capturing apparatus 100 may have an advantage of a wide-angle lens.

The second lens element 104 is adapted to correct aberrations generated by the first lens element 102 to help reducing spherical aberration, so as to improve imaging quality. In the embodiment, the second lens element 104 has a positive refractive poser. Moreover, the object side surface S5 of the second lens element 104 is convex near the optical axis, and the image side surface S6 of the second lens element 104 is convex near the optical axis. The second lens element 102 may be made of a plastic material to satisfy the demand of lightweight, but the disclosure is not limited thereto. In any exemplary embodiment of the disclosure, the image side surface S6 of the second lens element 104 may be coated with an infrared filter material. Alternatively, an infrared filter layer (not shown) may be disposed between the second lens element 104 and the imaging plane S7.

In the image capturing apparatus 100, only the first lens element 102 and the second lens element 104 have the refractive powers, and the number of the lens elements having the refractive power in the image capturing apparatus 100 is only two. Namely, the number of the lens elements in the image capturing apparatus 100 is only two.

Detailed optical data of the first embodiment is shown in table one.

TABLE ONE

| | | f = 0.312 mm, Fno = 2.64, HFOV = 60°, imgH = 0.402 mm | | | | |
|---|---|---|---|---|---|---|
| | surface | radius of curvature (mm) | distance (mm) | refractive index | dispersion coefficient | focal length (mm) |
| tested object 10 | surface S10 | | 0 | | | |
| cover plate 101 | object side surface S1 | infinity | 1.800 | 1.52 | 64.2 | |
| | image side surface S2 | infinity | 0.600 | | | |
| first lens element 102 | object side surface S3 | 3.5083 | 0.582 | 1.585 | 29.9 | −0.51 |
| | image side surface S4 | 2.0231 | 0.200 | | | |
| aperture 103 | | infinity | 0.100 | | | |
| second lens element 104 | object side surface S5 | 1.0476 | 0.381 | 1.585 | 29.9 | 0.38 |
| | image side surface S6 | −0.5496 | 0.600 | | | |
| imaging plane S7 | imaging plane S7 | infinity | | | | |

In the table one:

f is an effective focal length (EFL) of the image capturing apparatus 100;

Fno is an f-number of the image capturing apparatus 100;

HFOV is a half field of view (HFOV) of the image capturing apparatus 100, i.e. a half of the FOV;

imgH is a maximum imaging height of the image capturing apparatus 100 (i.e. a half of a diagonal length of an effective photosensitive region of the sensor in the image capturing apparatus 100).

Infinity of the "radius of curvature (mm)" represents that a corresponding surface is a plane. "distance (mm)" represents a distance from a corresponding surface to a next surface on the optical axis I. For example, the "distance (mm)" of the tested object 10 being 0 represents that a distance from a surface S10 of the tested object 10 facing the cover plate 101 to the object side surface S1 of the cover plate 101 on the optical axis I is 0 mm. The "distance (mm)" of the object side surface S1 of the cover plate 101 being 1.800 represents that a distance from the object side surface S1 of the cover plate 101 to the image side surface S2 of the cover plate 101 on the optical axis I is 1.800 mm. The "distance (mm)" of the image side surface S6 of the second lens element 104 being 0.6 represents that a distance from the object side surface S6 of the second lens element 104 to the imaging plane S7 on the optical axis I is 0.6 mm. The other fields are deduced by analogy, and detail thereof is not repeated.

In the embodiment, the object side surface S3 of the first lens element 102, the image side surface S4 of the first lens element 102, the object side surface S5 of the second lens element 104 and the image side surface S6 of the second lens element 104 are all aspheric surfaces. The aspheric surface is defined according to equation (1):

$$Z(Y) = \frac{Y^2}{R} / \left(1 + \sqrt{1 - (1+K)\frac{Y^2}{R^2}}\right) + \sum_{i=1}^{n} a_{2i} \times Y^i \quad (1)$$

In the equation (1):
Y represents a vertical distance between a point on the aspheric surface and the optical axis I;
Z represents a depth of the aspheric surface (a vertical distance between a point on the aspheric surface with a distance of Y from the optical axis I and a tangent plane tangent to a vertex of the aspheric surface on the optical axis I);
R represents a radius of curvature of a lens surface near the optical axis;
K represents a conic constant;
$a_{2i}$ represents a $2i^{th}$ order aspheric coefficient.

Various aspheric coefficients of the object side surface S3 of the first lens element 102, the image side surface S4 of the first lens element 102, the object side surface S5 of the second lens element 104 and the image side surface S6 of the second lens element 104 in the equation (1) are shown in table two.

TABLE TWO

| | lens | | | |
|---|---|---|---|---|
| | first lens element 102 | | second lens element 104 | |
| | surface | | | |
| | object side surface S3 | image side surface S4 | object side surface S5 | image side surface S6 |
| K | 6.943 | 92.449 | −199.001 | −0.677 |
| $a_2$ | −0.054 | 1.557 | −0.001 | −1.103 |
| $a_4$ | 0 | 0 | −0.504 | −1.264 |
| $a_6$ | 0 | 0 | 0.363 | −9.849 |
| $a_8$ | 0 | 0 | 0 | 0 |
| $a_{10}$ | 0 | 0 | 0 | 0 |
| $a_{12}$ | 0 | 0 | 0 | 0 |
| $a_{14}$ | 0 | 0 | 0 | 0 |
| $a_{16}$ | 0 | 0 | 0 | 0 |

Relationship of various important parameters in the image capturing apparatus 100 of the first embodiment is shown in table three.

TABLE THREE

| conditional expression | value |
|---|---|
| f/imgH | 0.777 |
| N1 + N2 | 3.17 |
| OTL (mm) | 4.263 |
| d (mm) | 1.8 |
| OTL − d (mm) | 2.463 |
| (OTL − d)/imgH | 6.127 |
| V1 + V2 | 59.8 |
| \|f/f1\| + \|f/f2\| | 1.423 |
| FOV (degree) | 120 |

In the table three:
N1 is a refractive index of the first lens element 102;
N2 is a refractive index of the second lens element 104;
OTL is a distance from the tested object 10 to the imaging plane S7 on the optical axis I, and is also a distance from the object side surface S1 of the cover plate 101 to the imaging plane S7 on the optical axis I;
d is a thickness of the cover plate 101;
V1 is a dispersion coefficient of the first lens element 102, and the dispersion coefficient may also be referred to as Abbe number;
V2 is a dispersion coefficient of the second lens element 104;
f1 is a focal length of the first lens element 102;
f2 is a focal length of the second lens element 104.

Figure 2A:
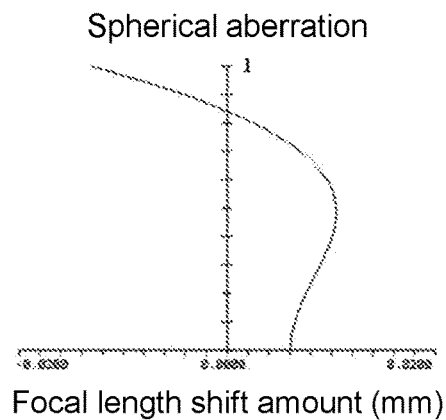
FIG. 2A to FIG. 2C are diagrams respectively illustrating a longitudinal spherical aberration and various aberrations of the image capturing apparatus of the first embodiment.
Figure 2B:
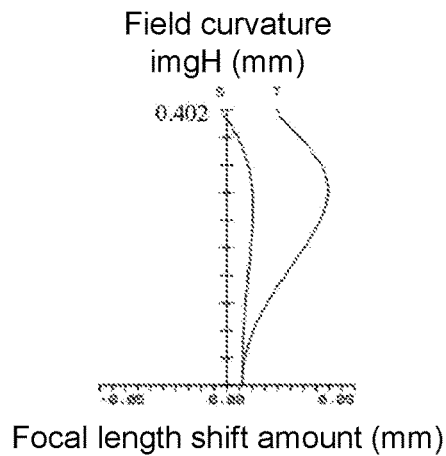
Figure 2C:
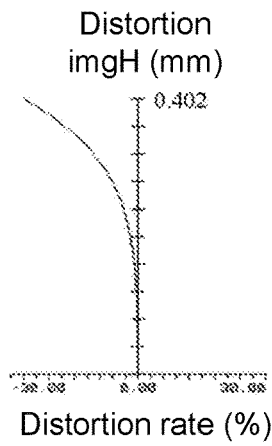

FIG. 2A to FIG. 2C are diagrams respectively illustrating a longitudinal spherical aberration and various aberrations of the image capturing apparatus of the first embodiment. FIG. 2A illustrates a longitudinal spherical aberration when a wavelength is 550 nm and a pupil radius is 0.0592 mm. FIG. 2B illustrates a field curvature aberration in a sagittal direction and a field curvature aberration in a tangential direction on the imaging plane S7 when the wavelength is 550 nm, where the field curvature aberrations in the sagittal direction and the tangential direction are respectively represented by a curve S and a curve T. FIG. 2C illustrates a distortion aberration on the imaging plane S7 when the wavelength is 550 nm. From FIG. 2A to FIG. 2C, it is learned that the image capturing apparatus 100 of the first embodiment may obviously mitigate the spherical aberration, effectively eliminate aberrations and maintain the distortion aberration within an imaging quality requirement. Therefore, the image capturing apparatus 100 of the first embodiment may provide good imaging quality while achieving the thinning effect (OTL is reduced to 4.263 mm).

According to different requirements, the image capturing apparatus 100 may further include other components/film layers, or omit components/film layers in FIG. 1. For example, the image capturing apparatus 100 may further include a light source 105 to provide a light beam B3 irradiating the tested object 10. The light source 105 is disposed under the cover plate 101. In other words, the light source 105, the first lens element 102, the aperture 103 and the second lens element 104 are located at the same side of the cover plate 101.

The light source 105 may be a visible light source. For example, a wavelength of the light source 105 is between 400 nm and 600 nm, but the disclosure is not limited thereto. Alternatively, the light source 105 may be an invisible light source, such as an infrared light source. In another embodiment, when the image capturing apparatus 100 is configured with a display module, a part of a display light beam emitted by the display module may be used for biological feature recognition, so as to omit the light source 105.

Figure 3:
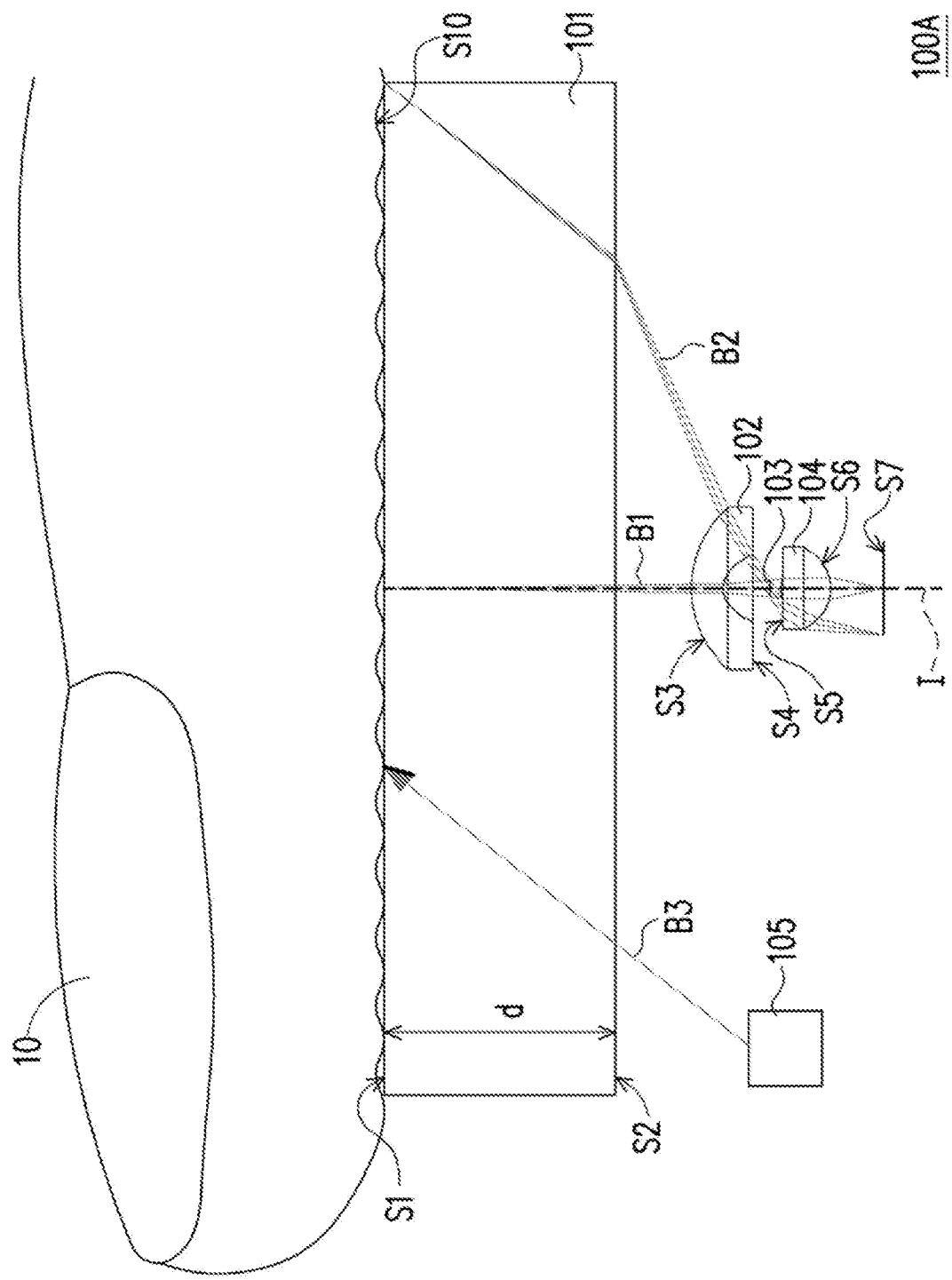
FIG. 3 is a schematic diagram of an image capturing apparatus according to a second embodiment of the disclosure.

FIG. 3 is a schematic diagram of an image capturing apparatus according to a second embodiment of the disclosure. Referring to FIG. 3, a difference between the image capturing apparatus 100A of the second embodiment and the image capturing apparatus 100 of FIG. 1 is that optical data, aspheric coefficients and parameters between these lens elements have some differences.

Detailed optical data of the second embodiment is shown in table four.

TABLE FOUR f = 0.179 mm, Fno = 2.58, HFOV = 60°, imgH = 0.358 mm

| | surface | radius of curvature (mm) | distance (mm) | refractive index | dispersion coefficient | focal length (mm) |
|---|---|---|---|---|---|---|
| tested object 10 | surface S10 | | 0 | | | |
| cover plate 101 | object side surface S1 | infinity | 1.800 | 1.52 | 64.2 | |
| | image side surface S2 | infinity | 0.600 | | | |
| first lens element 102 | object side surface S3 | 2.080 | 0.25 | 1.585 | 29.9 | −0.43 |
| | image side surface S4 | 0.327 | 0.364 | | | |
| aperture 103 | | infinity | 0.100 | | | |
| second lens element 104 | object side surface S5 | 0.801 | 0.381 | 1.674 | 29.9 | 0.31 |
| | image side surface S6 | −0.534 | 0.400 | | | |
| imaging plane S7 | imaging plane S7 | infinity | | | | |

Various aspheric coefficients of the object side surfaces and the image side surfaces of the lens elements of the second embodiment in the equation (1) are as shown in table five.

TABLE FIVE

| | lens element | | | |
|---|---|---|---|---|
| | first lens element 102 | | second lens element 104 | |
| | surface | | | |
| | object side surface S3 | image side surface S4 | object side surface S5 | image side surface S6 |
| K | 9.324 | 0.331 | −127.237 | 0.637 |
| $a_2$ | 0.397 | 1.449 | −0.038 | −1.266 |
| $a_4$ | 0 | 0 | −2.280 | 2.349 |
| $a_6$ | 0 | 0 | 9.492 | −16.409 |
| $a_8$ | 0 | 0 | 0 | 0 |
| $a_{10}$ | 0 | 0 | 0 | 0 |
| $a_{12}$ | 0 | 0 | 0 | 0 |
| $a_{14}$ | 0 | 0 | 0 | 0 |
| $a_{16}$ | 0 | 0 | 0 | 0 |

Relationship of various important parameters in the second embodiment is shown in table six.

TABLE SIX

| conditional expression | value |
|---|---|
| f/imgH | 0.499 |
| N1 + N2 | 3.259 |

TABLE SIX-continued

| conditional expression | value |
|---|---|
| OTL (mm) | 3.895 |
| d (mm) | 1.8 |
| OTL − d (mm) | 2.095 |
| (OTL − d)/imgH | 5.852 |
| V1 + V2 | 59.8 |
| |f/f1| + |f/f2| | 0.995 |
| FOV (degree) | 120 |

Figure 4A:
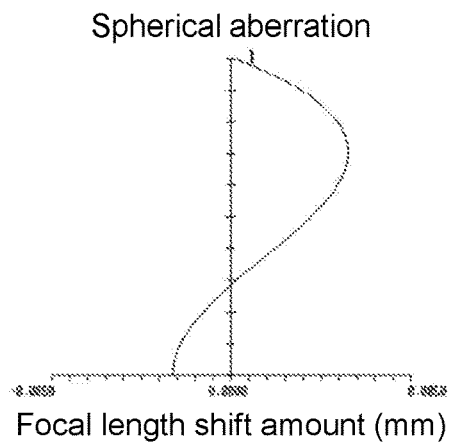
FIG. 4A to FIG. 4C are diagrams respectively illustrating a longitudinal spherical aberration and various aberrations of the image capturing apparatus of the second embodiment.
Figure 4B:
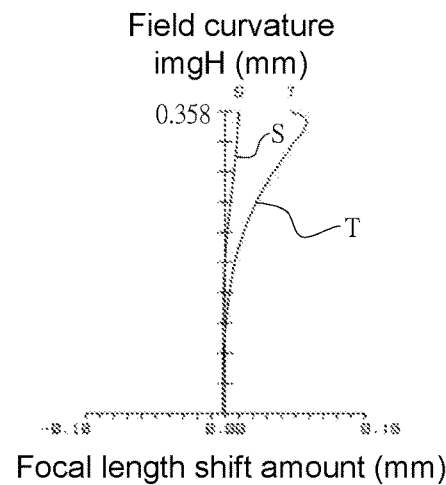
Figure 4C:
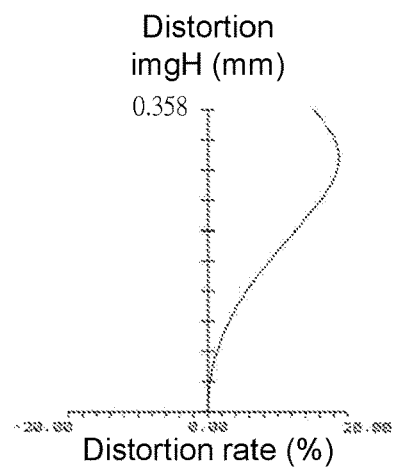

FIG. 4A to FIG. 4C are diagrams respectively illustrating a longitudinal spherical aberration and various aberrations of the image capturing apparatus of the second embodiment. FIG. 4A illustrates a longitudinal spherical aberration when a wavelength is 550 nm and a pupil radius is 0.0346 mm. FIG. 4B illustrates a field curvature aberration in a sagittal direction and a field curvature aberration in a tangential direction on the imaging plane S7 when the wavelength is 550 nm. FIG. 4C illustrates a distortion aberration on the imaging plane S7 when the wavelength is 550 nm. From FIG. 4A to FIG. 4C, it is learned that the image capturing apparatus 100A of the second embodiment may obviously mitigate the spherical aberration, effectively eliminate aberrations and maintain the distortion aberration within an imaging quality requirement. Therefore, the image capturing apparatus 100A of the second embodiment may provide good imaging quality while achieving the thinning effect (OTL is reduced to 3.895 mm).

Figure 5:
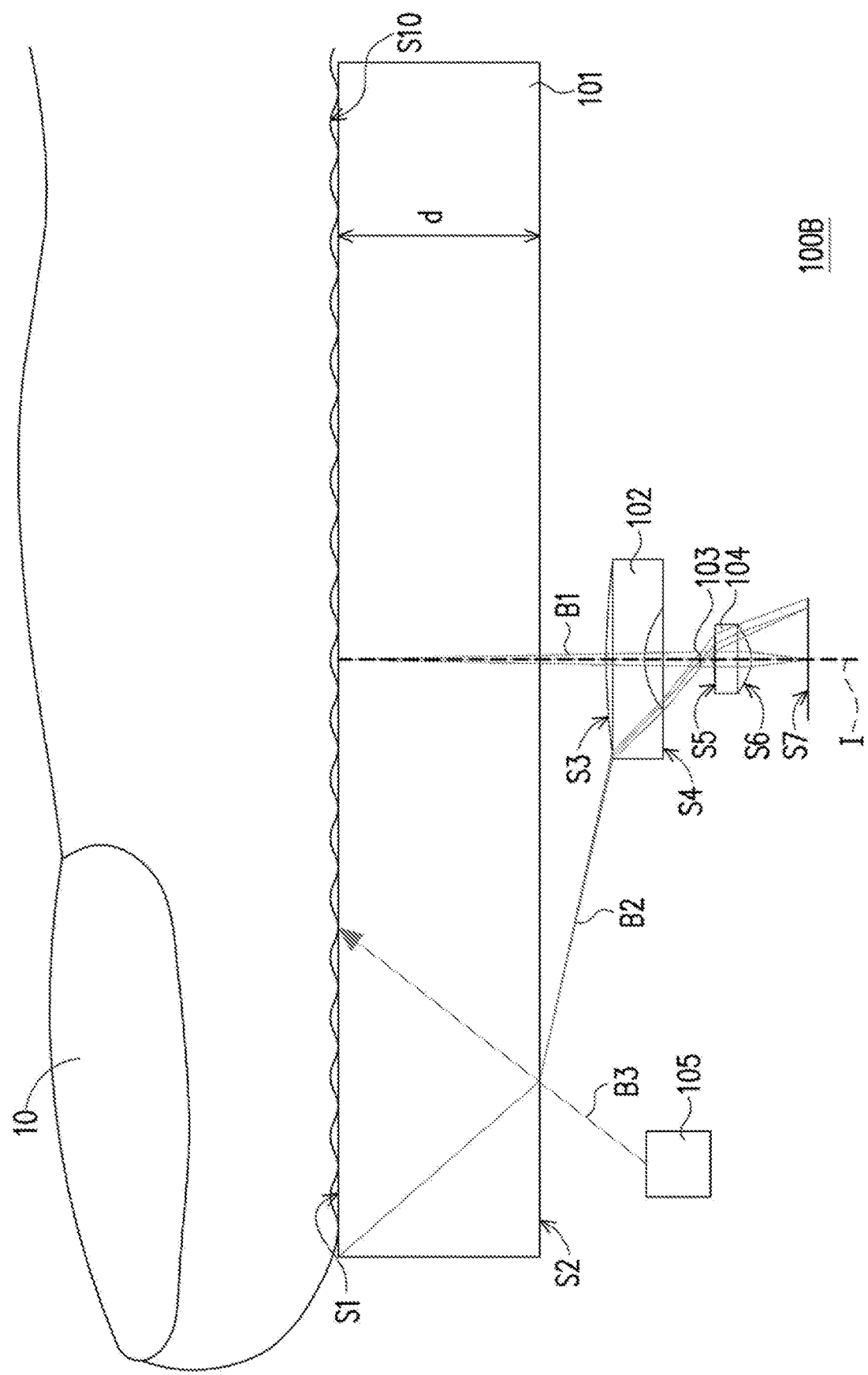
FIG. 5 is a schematic diagram of an image capturing apparatus according to a third embodiment of the disclosure.

FIG. 5 is a schematic diagram of an image capturing apparatus according to a third embodiment of the disclosure. Referring to FIG. 5, a difference between the image capturing apparatus 100B of the third embodiment and the image capturing apparatus 100 of FIG. 1 is that optical data, aspheric coefficients and parameters between these lens elements have some differences.

Detailed optical data of the third embodiment is shown in table seven.

TABLE SEVEN f = 0.351 mm, Fno = 3.87, HFOV = 56°, imgH = 0.406 mm

| | surface | radius of curvature (mm) | distance (mm) | refractive index | dispersion coefficient | focal length (mm) |
|---|---|---|---|---|---|---|
| tested object 10 | surface S10 | | 0 | | | |
| cover plate 101 | object side surface S1 | infinity | 1.8 | 1.52 | 64.2 | |
| | image side surface S2 | infinity | 0.6 | | | |
| first lens element 102 | object side surface S3 | 0.0382 | 0.35 | 1.585 | 21.5 | −1.44 |
| | image side surface S4 | 0.527 | 0.5 | | | |
| aperture 103 | | infinity | 0.1 | | | |
| second lens element 104 | object side surface S5 | 0.132 | 0.35 | 1.585 | 21.5 | 0.43 |
| | image side surface S6 | −0.865 | 0.502 | | | |
| imaging plane S7 | imaging plane S7 | infinity | | | | |

Various aspheric coefficients of the object side surfaces and the image side surfaces of the lens elements of the third embodiment in the equation (1) are as shown in table eight.

TABLE EIGHT

| | lens | | | |
|---|---|---|---|---|
| | first lens element 102 | | second lens element 104 | |
| | surface | | | |
| | object side surface S3 | image side surface S4 | object side surface S5 | image side surface S6 |
| K | −1.00 | −0.638 | −1.036 | 14.904 |
| $a_2$ | −12.966 | 0.242 | −3.114 | −1.024 |
| $a_4$ | 0 | 0 | 0.202 | 0.834 |
| $a_6$ | 0 | 0 | 11.570 | 3.083 |
| $a_8$ | 0 | 0 | 280.639 | 22.162 |
| $a_{10}$ | 0 | 0 | 5177.331 | 157.458 |
| $a_{12}$ | 0 | 0 | 5.092E+004 | 1397.136 |
| $a_{14}$ | 0 | 0 | −1.120E+006 | 2.569E+004 |
| $a_{16}$ | 0 | 0 | −9.011E+007 | 5.438E+005 |

Relationship of various important parameters in the third embodiment is shown in table nine.

TABLE NINE

| conditional expression | value |
|---|---|
| f/imgH | 0.864 |
| N1 + N2 | 3.17 |
| OTL (mm) | 4.202 |
| d (mm) | 1.8 |
| OTL − d (mm) | 2.402 |
| (OTL − d)/imgH | 5.916 |

TABLE NINE-continued

| conditional expression | value |
|---|---|
| V1 + V2 | 43 |
| |f/f1| + |f/f2| | 1.065 |
| FOV (degree) | 112 |

Figure 6A:
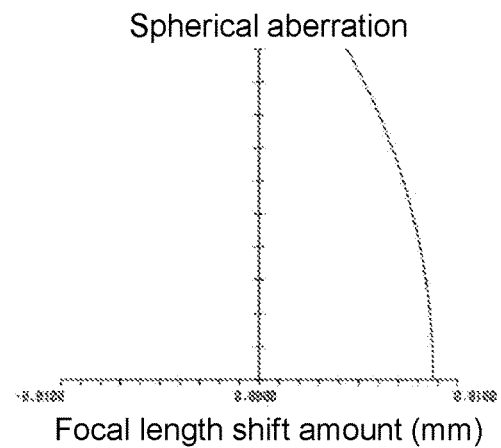
FIG. 6A to FIG. 6C are diagrams respectively illustrating a longitudinal spherical aberration and various aberrations of the image capturing apparatus of the third embodiment.
Figure 6B:
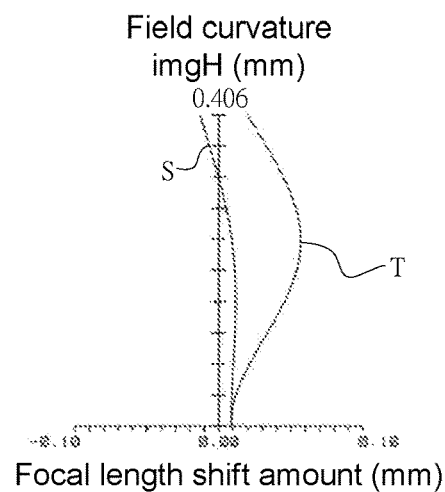
Figure 6C:
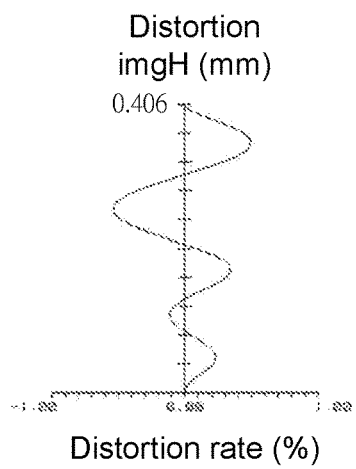

FIG. 6A to FIG. 6C are diagrams respectively illustrating a longitudinal spherical aberration and various aberrations of the image capturing apparatus of the third embodiment. FIG. 6A illustrates a longitudinal spherical aberration when a wavelength is 550 nm and a pupil radius is 0.0453 mm. FIG. 6B illustrates a field curvature aberration in a sagittal direction and a field curvature aberration in a tangential direction on the imaging plane S7 when the wavelength is 550 nm. FIG. 6C illustrates a distortion aberration on the imaging plane S7 when the wavelength is 550 nm. From FIG. 6A to FIG. 6C, it is learned that the image capturing apparatus 100B of the third embodiment may obviously mitigate the spherical aberration, effectively eliminate aberrations and maintain the distortion aberration within an imaging quality requirement. Therefore, the image capturing apparatus 100B of the third embodiment may provide good imaging quality while achieving the thinning effect (OTL is reduced to 4.202 mm).

FIG. 7 is a schematic diagram of an image capturing apparatus according to a fourth embodiment of the disclosure. Referring to FIG. 7, a difference between the image capturing apparatus 100C of the fourth embodiment and the image capturing apparatus 100 of FIG. 1 is that optical data, aspheric coefficients and parameters between these lens elements have some differences.

Detailed optical data of the fourth embodiment is shown in table ten.

TABLE TEN f = 0.260 mm, Fno = 3.17, HFOV = 70°, imgH = 0.6 mm

| | surface | radius of curvature (mm) | distance (mm) | refractive index | dispersion coefficient | focal length (mm) |
|---|---|---|---|---|---|---|
| tested object 10 | surface S10 | | 0 | | | |
| cover plate 101 | object side surface S1 | infinity | 1.8 | 1.52 | 64.2 | |

TABLE TEN-continued f = 0.260 mm, Fno = 3.17, HFOV = 70°, imgH = 0.6 mm

| | surface | radius of curvature (mm) | distance (mm) | refractive index | dispersion coefficient | focal length (mm) |
|---|---|---|---|---|---|---|
| | image side surface S2 | infinity | 0.165 | | | |
| first lens element 102 | object side surface S3 | 1.739 | 0.1 | 1.674 | 21.5 | −0.667 |
| | image side surface S4 | 0.351 | 0.65 | | | |
| aperture 103 | | infinity | 0.2 | | | |
| second lens element 104 | object side surface S5 | 1.099 | 0.5 | 1.674 | 21.5 | 0.493 |
| | image side surface S6 | −0.639 | 0.65 | | | |
| imaging plane S7 | imaging plane S7 | infinity | | | | |

Various aspheric coefficients of the object side surfaces and the image side surfaces of the lens elements of the fourth embodiment in the equation (1) are as shown in table eleven.

TABLE ELEVEN

| | lens | | | |
|---|---|---|---|---|
| | first lens element 102 | | second lens element 104 | |
| | surface | | | |
| | object side surface S3 | image side surface S4 | object side surface S5 | image side surface S6 |
| K | 1.287 | −0.445 | −81.371 | −0.071 |
| $a_2$ | 0 | 0 | −0.045 | −0.511 |
| $a_4$ | 0.035 | 2.651 | −0.269 | −0.190 |
| $a_6$ | −0.003 | −10.764 | 0.384 | 1.059 |
| $a_8$ | 0.055 | 24.630 | 3.015 | 2.446 |
| $a_{10}$ | 0 | 0 | −15.445 | −8.138 |
| $a_{12}$ | 0 | 0 | 0 | 0 |
| $a_{14}$ | 0 | 0 | 0 | 0 |
| $a_{16}$ | 0 | 0 | 0 | 0 |

Relationship of various important parameters in the fourth embodiment is shown in table twelve.

TABLE TWELVE

| conditional expression | value |
|---|---|
| f/imgH | 0.432 |
| N1 + N2 | 3.348 |
| OTL (mm) | 4.065 |
| d (mm) | 1.8 |
| OTL − d (mm) | 2.264 |
| (OTL − d)/imgH | 3.773 |

TABLE TWELVE-continued

| conditional expression | value |
|---|---|
| V1 + V2 | 43 |
| \|f/f1\| + \|f/f2\| | 0.913 |
| FOV (degree) | 140 |

Figure 8A:
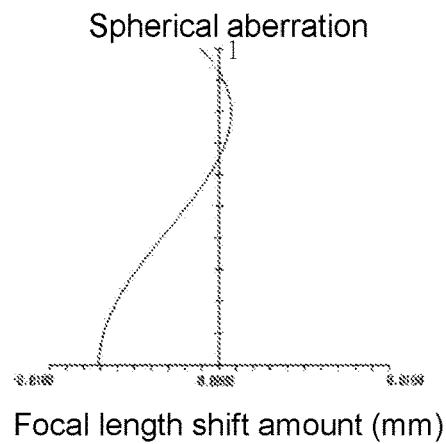
FIG. 8A to FIG. 8C are diagrams respectively illustrating a longitudinal spherical aberration and various aberrations of the image capturing apparatus of the fourth embodiment.
Figure 8B:
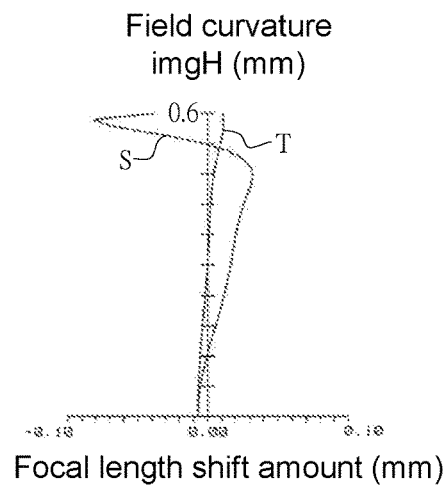
Figure 8C:
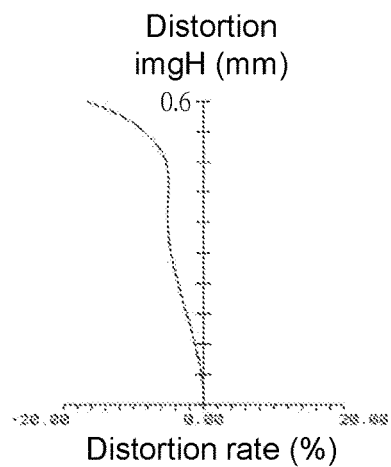

FIG. 8A to FIG. 8C are diagrams respectively illustrating a longitudinal spherical aberration and various aberrations of the image capturing apparatus of the fourth embodiment. FIG. 8A illustrates a longitudinal spherical aberration when a wavelength is 550 nm and a pupil radius is 0.0410 mm. FIG. 8B illustrates a field curvature aberration in a sagittal direction and a field curvature aberration in a tangential direction on the imaging plane S7 when the wavelength is 550 nm. FIG. 8C illustrates a distortion aberration on the imaging plane S7 when the wavelength is 550 nm. From FIG. 8A to FIG. 8C, it is learned that the image capturing apparatus 100C of the fourth embodiment may obviously mitigate the spherical aberration, effectively eliminate aberrations and maintain the distortion aberration within an imaging quality requirement. Therefore, the image capturing apparatus 100C of the fourth embodiment may provide good imaging quality while achieving the thinning effect (OTL is reduced to 4.065 mm).

Figure 9:
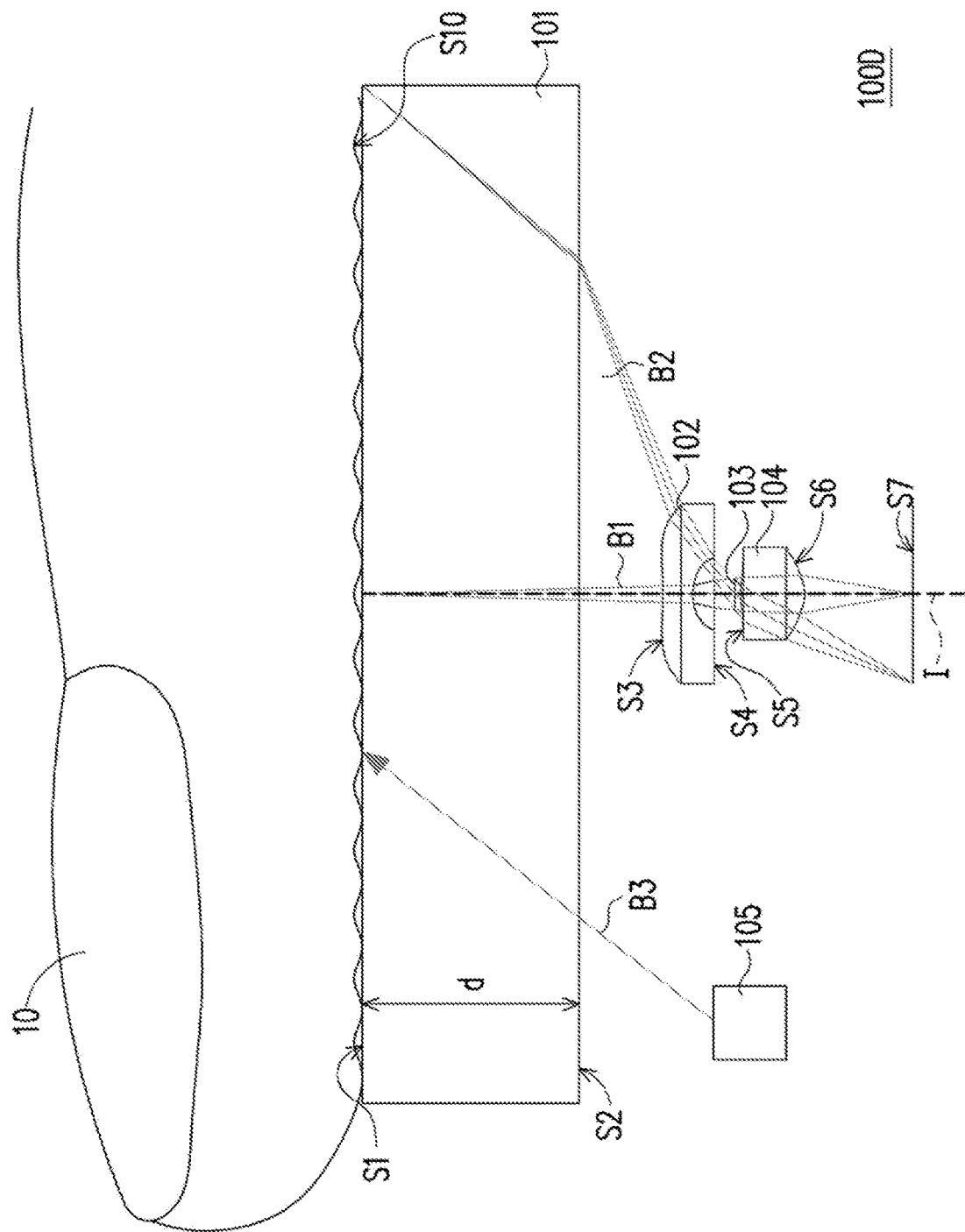
FIG. 9 is a schematic diagram of an image capturing apparatus according to a fifth embodiment of the disclosure.

FIG. 9 is a schematic diagram of an image capturing apparatus according to a fifth embodiment of the disclosure. Referring to FIG. 9, a difference between the image capturing apparatus 100D of the fifth embodiment and the image capturing apparatus 100 of FIG. 1 is that optical data, aspheric coefficients and parameters between these lens elements have some differences.

Detailed optical data of the fifth embodiment is shown in table thirteen.

TABLE THIRTEEN f = 0.256 mm, Fno = 1.67, HFOV = 62°, imgH = 0.75 mm

| | surface | radius of curvature (mm) | distance (mm) | refractive index | dispersion coefficient | focal length (mm) |
|---|---|---|---|---|---|---|
| tested object 10 | surface S10 | | 0 | | | |
| cover plate 101 | object side surface S1 | infinity | 1.800 | 1.52 | 64.2 | |
| | image side surface S2 | infinity | 0.698 | | | |

TABLE THIRTEEN-continued f = 0.256 mm, Fno = 1.67, HFOV = 62°, imgH = 0.75 mm

| | surface | radius of curvature (mm) | distance (mm) | refractive index | dispersion coefficient | focal length (mm) |
|---|---|---|---|---|---|---|
| first lens element 102 | object side surface S3 | 1.84 | 0.250 | 1.64 | 29.9 | −0.588 |
| | image side surface S4 | 0.536 | 0.340 | | | |
| aperture 103 | | infinity | 0.050 | | | |
| second lens element 104 | object side surface S5 | 0.2547 | 0.528 | 1.64 | 29.9 | 0.353 |
| | image side surface S6 | −0.407 | 0.899 | | | |
| imaging plane S7 | imaging plane S7 | infinity | | | | |

Various aspheric coefficients of the object side surfaces and the image side surfaces of the lens elements of the fifth embodiment in the equation (1) are as shown in table fourteen.

TABLE FOURTEEN

| | lens | | | |
|---|---|---|---|---|
| | first lens element 102 | | second lens element 104 | |
| | surface | | | |
| | object side surface S3 | image side surface S4 | object side surface S5 | image side surface S6 |
| K | −36.746 | 2.453 | −853.23 | −0.961 |
| $a_2$ | 0 | 0 | 0 | 0 |
| $a_4$ | 1.462 | 13.062 | 17.876 | 0.089 |
| $a_6$ | −1.939 | −790.474 | −520.228 | −6.421 |
| $a_8$ | 1.971 | 2.761E+004 | 9052.881 | 232.343 |
| $a_{10}$ | −0.437 | −4.804E+005 | −7.843E+004 | −1044.373 |
| $a_{12}$ | −0.530 | 4.338E+006 | 1.344E+005 | −4184.558 |
| $a_{14}$ | 0.196 | −1.568E+007 | 1.782E+006 | 6.007E+004 |
| $a_{16}$ | 0.004 | 0 | 0 | −1.704E+005 |

Relationship of various important parameters in the fifth embodiment is shown in table fifteen.

TABLE FIFTEEN

| conditional expression | value |
|---|---|
| f/imgH | 0.341 |
| N1 + N2 | 3.28 |
| OTL (mm) | 4.565 |
| d (mm) | 1.8 |
| OTL − d (mm) | 2.81 |
| (OTL − d)/imgH | 3.747 |

TABLE FIFTEEN-continued

| conditional expression | value |
|---|---|
| V1 + V2 | 59.8 |
| |f/f1| + |f/f2| | 1.161 |
| FOV (degree) | 124 |

Figure 10A:
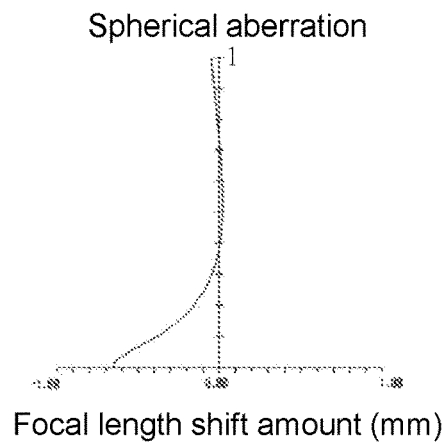
FIG. 10A to FIG. 10C are diagrams respectively illustrating a longitudinal spherical aberration and various aberrations of the image capturing apparatus of the fifth embodiment.
Figure 10B:
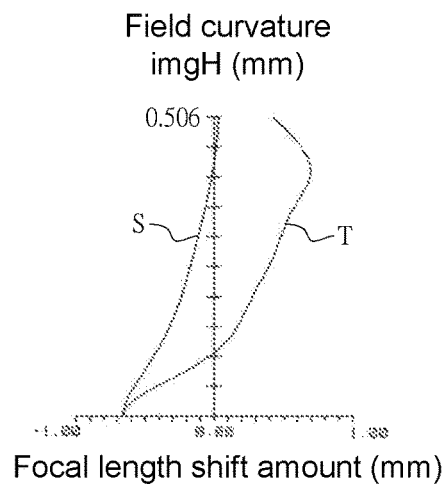
Figure 10C:
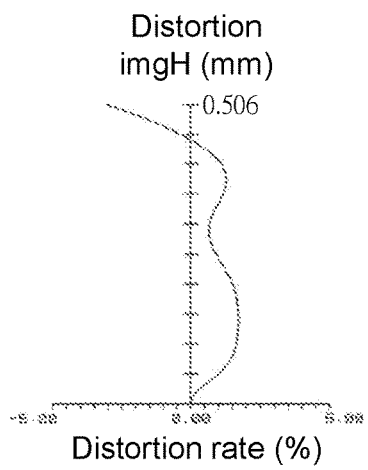

FIG. 10A to FIG. 10C are diagrams respectively illustrating a longitudinal spherical aberration and various aberrations of the image capturing apparatus of the fifth embodiment. FIG. 10A illustrates a longitudinal spherical aberration when a wavelength is 550 nm and a pupil radius is 0.0752 mm. FIG. 10B illustrates a field curvature aberration in a sagittal direction and a field curvature aberration in a tangential direction on the imaging plane S7 when the wavelength is 550 nm. FIG. 10C illustrates a distortion aberration on the imaging plane S7 when the wavelength is 550 nm. From FIG. 10A to FIG. 10C, it is learned that the image capturing apparatus 100D of the fifth embodiment may obviously mitigate the spherical aberration, effectively eliminate aberrations and maintain the distortion aberration within an imaging quality requirement. Therefore, the image capturing apparatus 100D of the fifth embodiment may provide good imaging quality while achieving the thinning effect (OTL is reduced to 4.565 mm).

Figure 11:
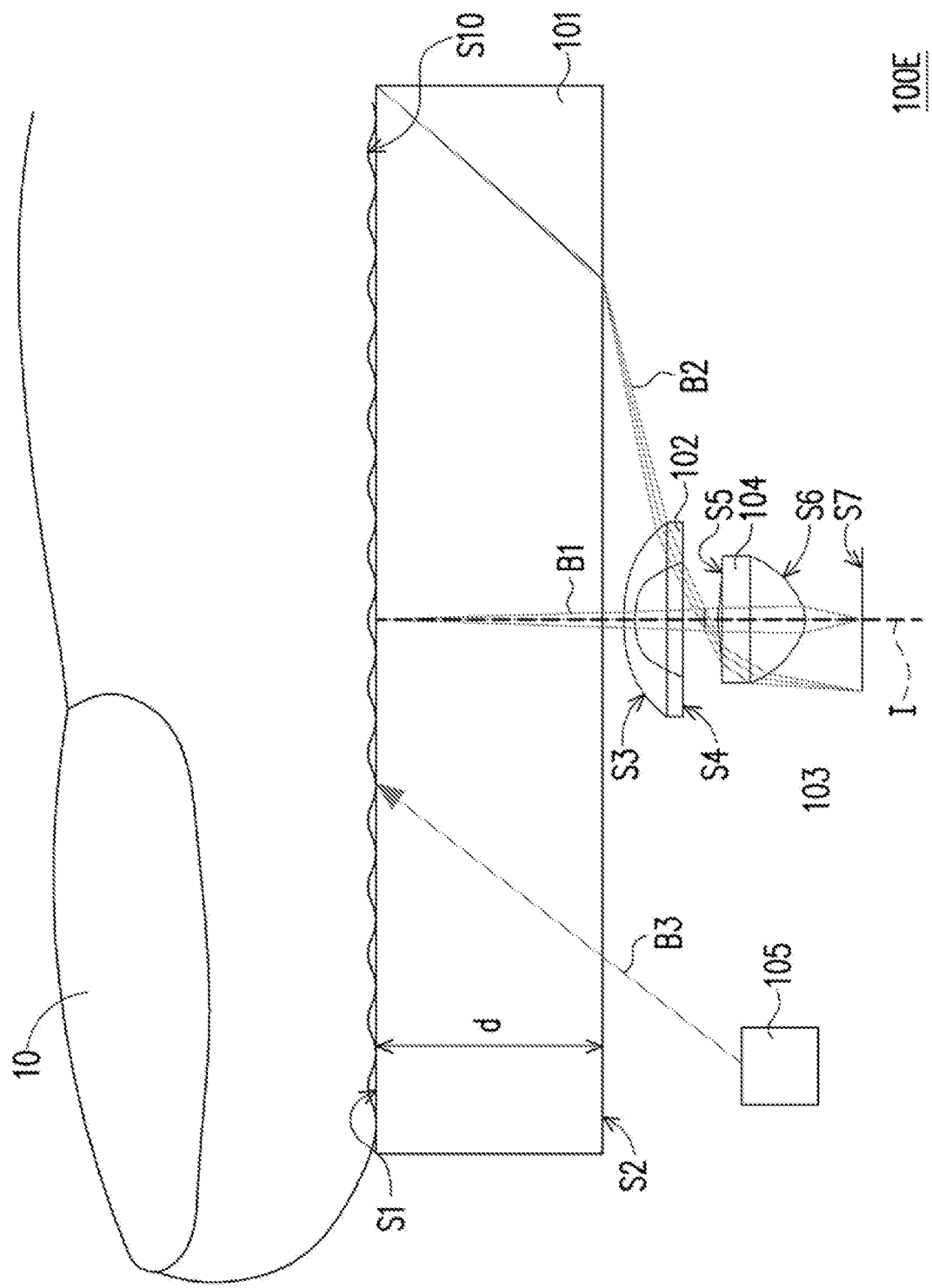
FIG. 11 is a schematic diagram of an image capturing apparatus according to a sixth embodiment of the disclosure.

FIG. 11 is a schematic diagram of an image capturing apparatus according to a sixth embodiment of the disclosure. Referring to FIG. 11, a difference between the image capturing apparatus 100E of the sixth embodiment and the image capturing apparatus 100 of FIG. 1 is that optical data, aspheric coefficients and parameters between these lens elements have some differences.

Detailed optical data of the sixth embodiment is shown in table sixteen.

TABLE SIXTEEN f = 0.365 mm, Fno = 2.5, HFOV = 68°, imgH = 0.552 mm

| | surface | radius of curvature (mm) | distance (mm) | refractive index | dispersion coefficient | focal length (mm) |
|---|---|---|---|---|---|---|
| tested object 10 | surface S10 | | 0 | | | |
| cover plate 101 | object side surface S1 | infinity | 1.8 | 1.52 | 64.2 | |
| | image side surface S2 | infinity | 0.165 | | | |

TABLE SIXTEEN-continued f = 0.365 mm, Fno = 2.5, HFOV = 68°, imgH = 0.552 mm

| | surface | radius of curvature (mm) | distance (mm) | refractive index | dispersion coefficient | focal length (mm) |
|---|---|---|---|---|---|---|
| first lens element 102 | object side surface S3 | 1.474 | 0.1 | 1.674 | 21.5 | −4.406 |
| | image side surface S4 | 0.961 | 0.55 | | | |
| aperture 103 | | infinity | 0.134 | | | |
| second lens element 104 | object side surface S5 | 0.381 | 0.667 | 1.674 | 21.5 | 0.408 |
| | image side surface S6 | −0.647 | 0.455 | | | |
| imaging plane S7 | imaging plane S7 | infinity | | | | |

Various aspheric coefficients of the object side surfaces and the image side surfaces of the lens elements of the sixth embodiment in the equation (1) are as shown in table seventeen.

TABLE SEVENTEEN

| | lens | | | |
|---|---|---|---|---|
| | first lens element 102 | | second lens element 104 | |
| | surface | | | |
| | object side surface S3 | image side surface S4 | object side surface S5 | image side surface S6 |
| K | 2.387 | 1.332 | −628.57 | −0.018 |
| $a_2$ | 0 | 0 | 0.001 | −0.899 |
| $a_4$ | 0.341 | 6.459 | −0.439 | 0.090 |
| $a_6$ | −0.024 | −3.089 | −0.412 | 0.422 |
| $a_8$ | −0.332 | 35.439 | 3.792 | 0.493 |
| $a_{10}$ | 0 | 0 | 27.702 | −12.166 |
| $a_{12}$ | 0 | 0 | 0 | −16.349 |
| $a_{14}$ | 0 | 0 | 0 | −72.068 |
| $a_{16}$ | 0 | 0 | 0 | 887.608 |

Relationship of various important parameters in the sixth embodiment is shown in table eighteen.

TABLE EIGHTEEN

| conditional expression | value |
|---|---|
| f/imgH | 0.661 |
| N1 + N2 | 3.348 |
| OTL (mm) | 3.871 |
| d (mm) | 1.8 |
| OTL − d (mm) | 2.07 |
| (OTL − d)/imgH | 3.75 |
| V1 + V2 | 43 |

TABLE EIGHTEEN-continued

| conditional expression | value |
|---|---|
| |f/f1| + |f/f2| | 0.977 |
| FOV (degree) | 136 |

Figure 12A:
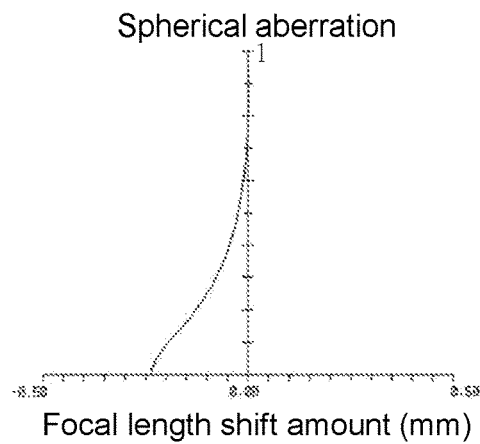
FIG. 12A to FIG. 12C are diagrams respectively illustrating a longitudinal spherical aberration and various aberrations of the image capturing apparatus of the sixth embodiment.
Figure 12B:
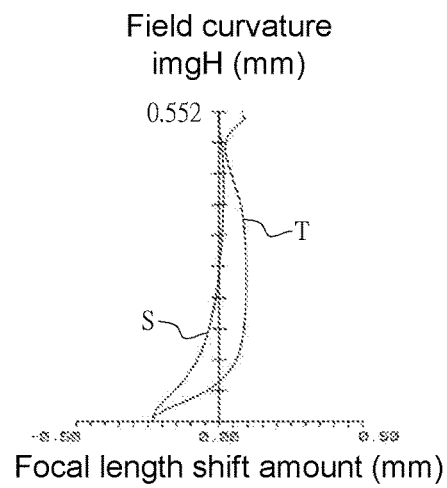
Figure 12C:
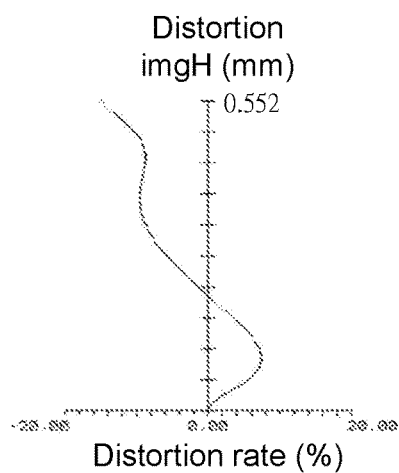

FIG. 12A to FIG. 12C are diagrams respectively illustrating a longitudinal spherical aberration and various aberrations of the image capturing apparatus of the sixth embodiment. FIG. 12A illustrates a longitudinal spherical aberration when a wavelength is 550 nm and a pupil radius is 0.0729 mm. FIG. 12B illustrates a field curvature aberration in a sagittal direction and a field curvature aberration in a tangential direction on the imaging plane S7 when the wavelength is 550 nm. FIG. 12C illustrates a distortion aberration on the imaging plane S7 when the wavelength is 550 nm. From FIG. 12A to FIG. 12C, it is learned that the image capturing apparatus 100E of the sixth embodiment may obviously mitigate the spherical aberration, effectively eliminate aberrations and maintain the distortion aberration within an imaging quality requirement. Therefore, the image capturing apparatus 100E of the sixth embodiment may provide good imaging quality while achieving the thinning effect (OTL is reduced to 3.871 mm).

Figure 13:
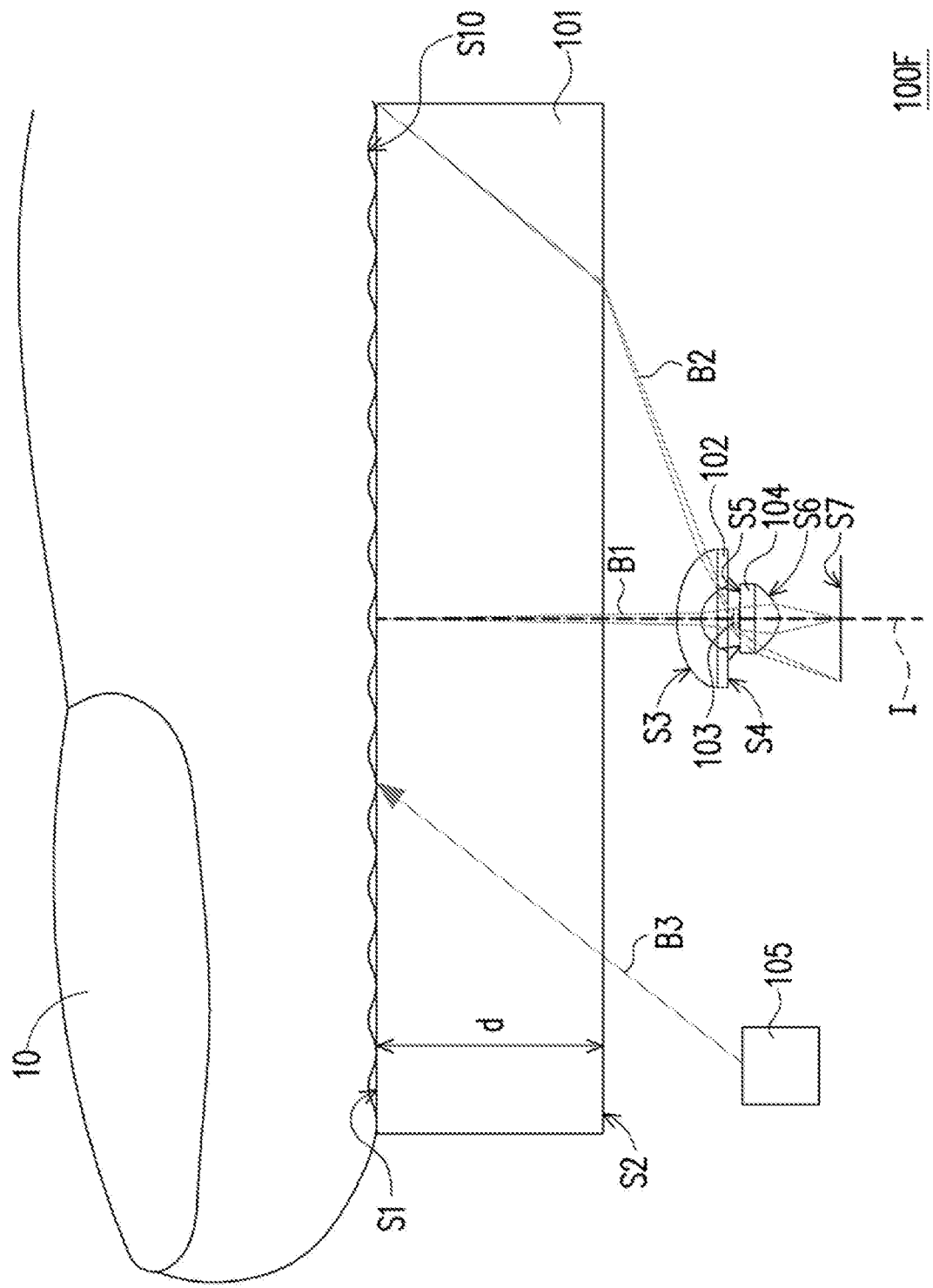
FIG. 13 is a schematic diagram of an image capturing apparatus according to a seventh embodiment of the disclosure.

FIG. 13 is a schematic diagram of an image capturing apparatus according to a seventh embodiment of the disclosure. Referring to FIG. 13, a difference between the image capturing apparatus 100F of the seventh embodiment and the image capturing apparatus 100 of FIG. 1 is that optical data, aspheric coefficients and parameters between these lens elements have some differences. Moreover, the object side surface S5 of the second lens element 104 is a plane near the optical axis.

Detailed optical data of the seventh embodiment is shown in table nineteen.

TABLE NINETEEN f = 0.229 mm, Fno = 2.09, HFOV = 63.5°, imgH = 0.514 mm

| | surface | radius of curvature (mm) | distance (mm) | refractive index | dispersion coefficient | focal length (mm) |
|---|---|---|---|---|---|---|
| tested object 10 | surface S10 | | 0 | | | |
| cover plate 101 | object side surface S1 | infinity | 1.8 | 1.52 | 64.2 | |
| | image side surface S2 | infinity | 0.6 | | | |

TABLE NINETEEN-continued f = 0.229 mm, Fno = 2.09, HFOV = 63.5°, imgH = 0.514 mm

|  | surface | radius of curvature (mm) | distance (mm) | refractive index | dispersion coefficient | focal length (mm) |
|---|---|---|---|---|---|---|
| first lens element 102 | object side surface S3 | 0.873 | 0.2 | 1.64 | 21.5 | −0.468 |
|  | image side surface S4 | 0.204 | 0.258 |  |  |  |
| aperture 103 |  | infinity | 0.005 |  |  |  |
| second lens element 104 | object side surface S5 | infinity | 0.3 | 1.64 | 21.5 | 0.301 |
|  | image side surface S6 | −0.195 | 0.503 |  |  |  |
| imaging plane S7 | imaging plane S7 | infinity |  |  |  |  |

Various aspheric coefficients of the object side surfaces and the image side surfaces of the lens elements of the seventh embodiment in the equation (1) are as shown in table twenty.

TABLE TWENTY

|  | lens | | | |
|---|---|---|---|---|
|  | first lens element 102 | | second lens element 104 | |
|  | surface | | | |
|  | object side surface S3 | image side surface S4 | object side surface S5 | image side surface S6 |
| K | 1.650 | −0.267 | 0 | −6.059 |
| $a_2$ | 0 | 0 | 0 | 0 |
| $a_4$ | 0 | −0.5991 | 0 | −44.061 |
| $a_6$ | 0 | 216.244 | 0 | 556.733 |
| $a_8$ | 0 | −5824.215 | 0 | −2851.832 |
| $a_{10}$ | 0 | 0 | 0 | 0 |
| $a_{10}$ | 0 | 0 | 0 | 0 |
| $a_{14}$ | 0 | 0 | 0 | 0 |
| $a_{16}$ | 0 | 0 | 0 | 0 |

Relationship of various important parameters in the seventh embodiment is shown in table twenty-one.

TABLE TWENTY-ONE

| conditional expression | value |
|---|---|
| f/imgH | 0.446 |
| N1 + N2 | 3.28 |
| OTL (mm) | 3.666 |
| d (mm) | 1.8 |
| OTL − d (mm) | 1.911 |
| (OTL − d)/imgH | 3.718 |
| V1 + V2 | 43 |
| |f/f1| + |f/f2| | 1.250 |
| FOV (degree) | 127 |

Figure 14A:
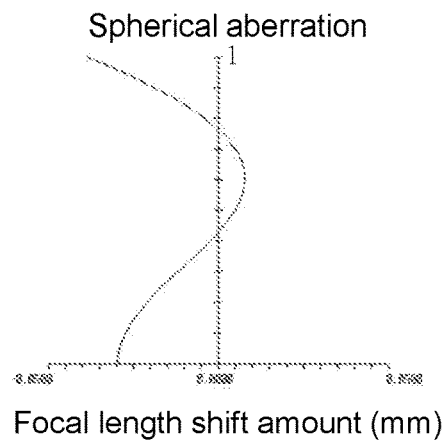
FIG. 14A to FIG. 14C are diagrams respectively illustrating a longitudinal spherical aberration and various aberrations of the image capturing apparatus of the seventh embodiment.
Figure 14B:
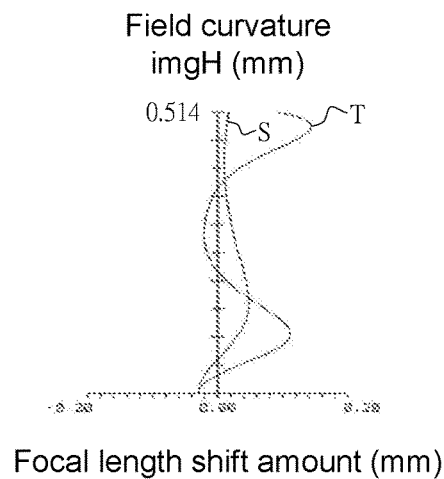
Figure 14C:
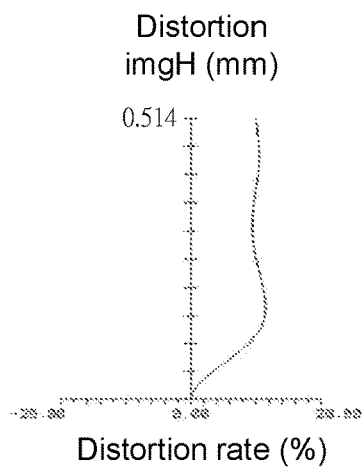

FIG. 14A to FIG. 14C are diagrams respectively illustrating a longitudinal spherical aberration and various aberrations of the image capturing apparatus of the seventh embodiment. FIG. 14A illustrates a longitudinal spherical aberration when a wavelength is 550 nm and a pupil radius is 0.0547 mm. FIG. 14B illustrates a field curvature aberration in a sagittal direction and a field curvature aberration in a tangential direction on the imaging plane S7 when the wavelength is 550 nm. FIG. 14C illustrates a distortion aberration on the imaging plane S7 when the wavelength is 550 nm. From FIG. 14A to FIG. 14C, it is learned that the image capturing apparatus 100F of the seventh embodiment may obviously mitigate the spherical aberration, effectively eliminate aberrations and maintain the distortion aberration within an imaging quality requirement. Therefore, the image capturing apparatus 100F of the seventh embodiment may provide good imaging quality while achieving the thinning effect (OTL is reduced to 3.666 mm).

Figure 15:
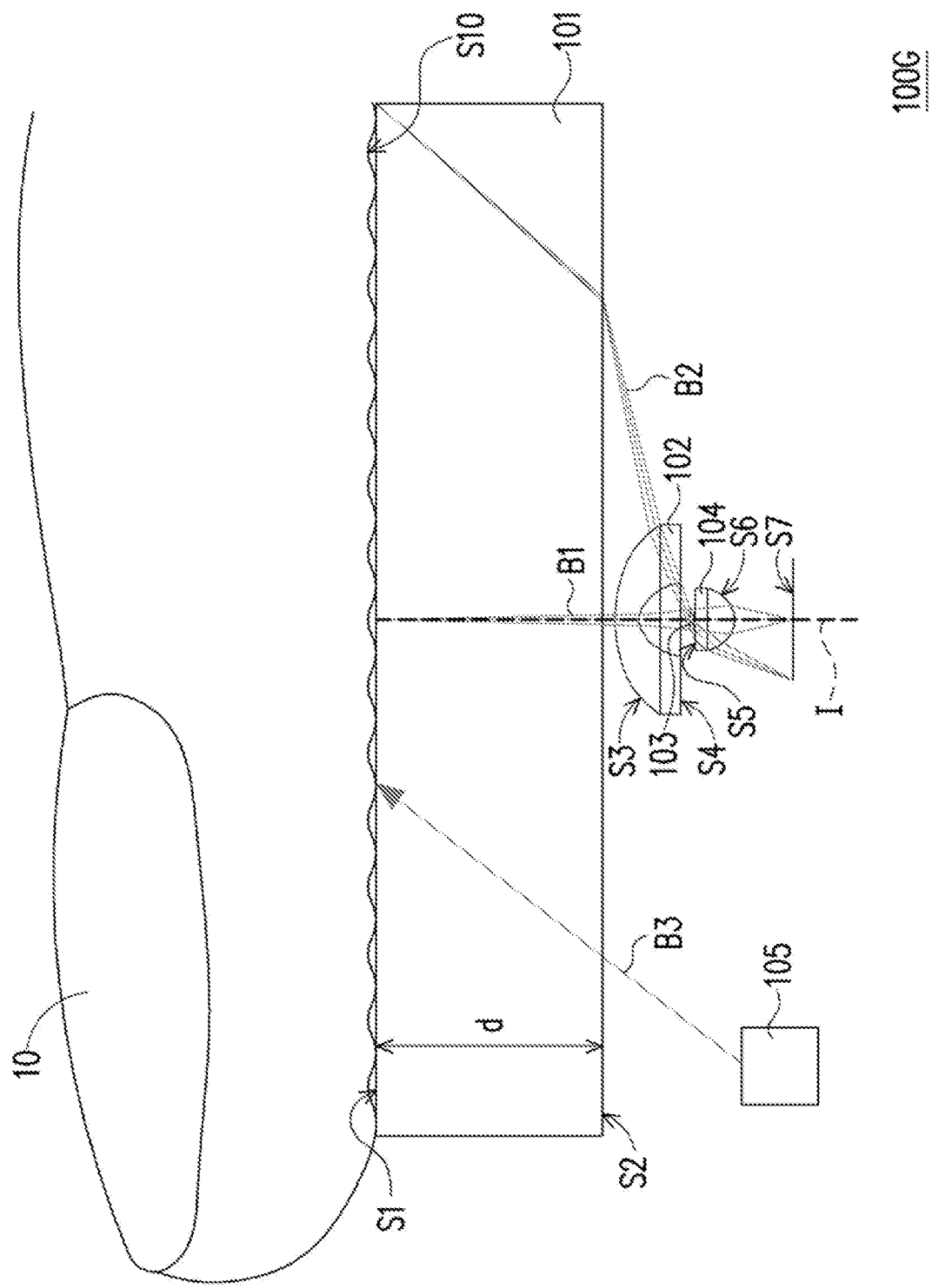
FIG. 15 is a schematic diagram of an image capturing apparatus according to an eighth embodiment of the disclosure.

FIG. 15 is a schematic diagram of an image capturing apparatus according to an eighth embodiment of the disclosure. Referring to FIG. 15, a difference between the image capturing apparatus 100G of the eighth embodiment and the image capturing apparatus 100 of FIG. 1 is that optical data, aspheric coefficients and parameters between these lens elements have some differences. Moreover, the object side surface S5 of the second lens element 104 is a plane near the optical axis.

Detailed optical data of the eighth embodiment is shown in table twenty-two.

TABLE TWENTY-TWO f = 0.183 mm, Fno = 2.5, HFOV = 68°, imgH = 0.445 mm

|  | surface | radius of curvature (mm) | distance (mm) | refractive index | dispersion coefficient | focal length (mm) |
|---|---|---|---|---|---|---|
| tested object 10 | surface S10 |  | 0 |  |  |  |
| cover plate 101 | object side surface S1 | infinity | 1.800 | 1.52 | 64.2 |  |
|  | image side surface S2 | infinity | 0.108 |  |  |  |

TABLE TWENTY-TWO-continued f = 0.183 mm, Fno = 2.5, HFOV = 68°, imgH = 0.445 mm

| | surface | radius of curvature (mm) | distance (mm) | refractive index | dispersion coefficient | focal length (mm) |
|---|---|---|---|---|---|---|
| first lens element 102 | object side surface S3 | 1.268 | 0.200 | 1.64 | 21.5 | −0.496 |
| | image side surface S4 | 0.240 | 0.403 | | | |
| aperture 103 | | infinity | 0.05 | | | |
| second lens element 104 | object side surface S5 | infinity | 0.300 | 1.64 | 21.5 | 0.297 |
| | image side surface S6 | −0.191 | 0.459 | | | |
| imaging plane S7 | imaging plane S7 | infinity | | | | |

Various aspheric coefficients of the object side surfaces and the image side surfaces of the lens elements of the eighth embodiment in the equation (1) are as shown in table twenty-three.

TABLE TWENTY-THREE

| | lens | | | |
|---|---|---|---|---|
| | first lens element 102 | | second lens element 104 | |
| | surface | | | |
| | object side surface S3 | image side surface S4 | object side surface S5 | image side surface S6 |
| K | 1.555 | −0.347 | 0 | −3.214 |
| $a_2$ | 0 | 0 | 0 | 0 |
| $a_4$ | 0.030 | 6.589 | −59.212 | −31.998 |
| $a_6$ | 0.137 | 151.501 | 1924.288 | 179.811 |
| $a_8$ | 0.121 | −5511.094 | 2495.569 | −3421.060 |
| $a_{10}$ | 0.093 | 3.019E+004 | −1.952E+006 | 2.060E+004 |
| $a_{12}$ | 0 | 5.549E+005 | 0 | 5.437E+005 |
| $a_{14}$ | 0 | 7.010E+006 | 0 | −5.454E+006 |
| $a_{16}$ | 0 | −1.439E+008 | 0 | −1.59E+008 |

Relationship of various important parameters in the eighth embodiment is shown in table twenty-four.

TABLE TWENTY-FOUR

| conditional expression | value |
|---|---|
| f/imgH | 0.411 |
| N1 + N2 | 3.28 |
| OTL (mm) | 3.32 |
| d (mm) | 1.8 |
| OTL − d (mm) | 1.52 |
| (OTL − d)/imgH | 3.416 |

TABLE TWENTY-FOUR-continued

| conditional expression | value |
|---|---|
| V1 + V2 | 43 |
| |f/f1| + |f/f2| | 1.005 |
| FOV (degree) | 136 |

Figure 16A:
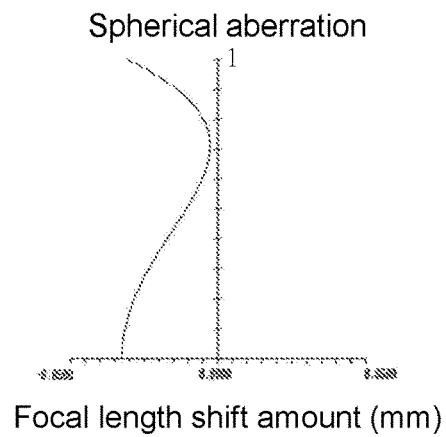
FIG. 16A to FIG. 16C are diagrams respectively illustrating a longitudinal spherical aberration and various aberrations of the image capturing apparatus of the eighth embodiment.
Figure 16B:
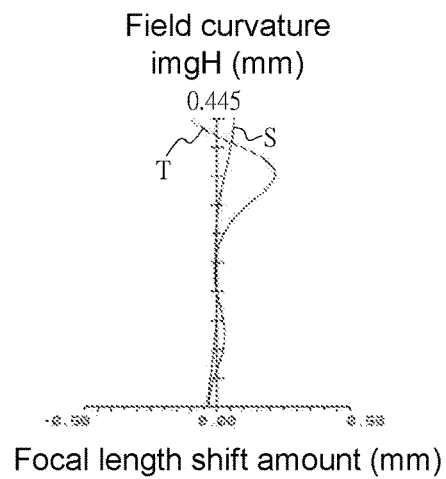
Figure 16C:
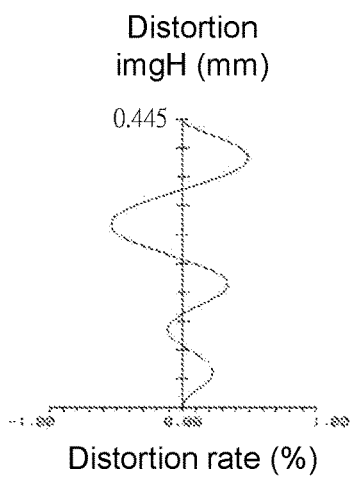

FIG. 16A to FIG. 16C are diagrams respectively illustrating a longitudinal spherical aberration and various aberrations of the image capturing apparatus of the eighth embodiment. FIG. 16A illustrates a longitudinal spherical aberration when a wavelength is 550 nm and a pupil radius is 0.0457 mm. FIG. 16B illustrates a field curvature aberration in a sagittal direction and a field curvature aberration in a tangential direction on the imaging plane S7 when the wavelength is 550 nm. FIG. 16C illustrates a distortion aberration on the imaging plane S7 when the wavelength is 550 nm. From FIG. 16A to FIG. 16C, it is learned that the image capturing apparatus 100G of the eighth embodiment may obviously mitigate the spherical aberration, effectively eliminate aberrations and maintain the distortion aberration within an imaging quality requirement. Therefore, the image capturing apparatus 100G of the eighth embodiment may provide good imaging quality while achieving the thinning effect (OTL is reduced to 3.32 mm).

Figure 17:
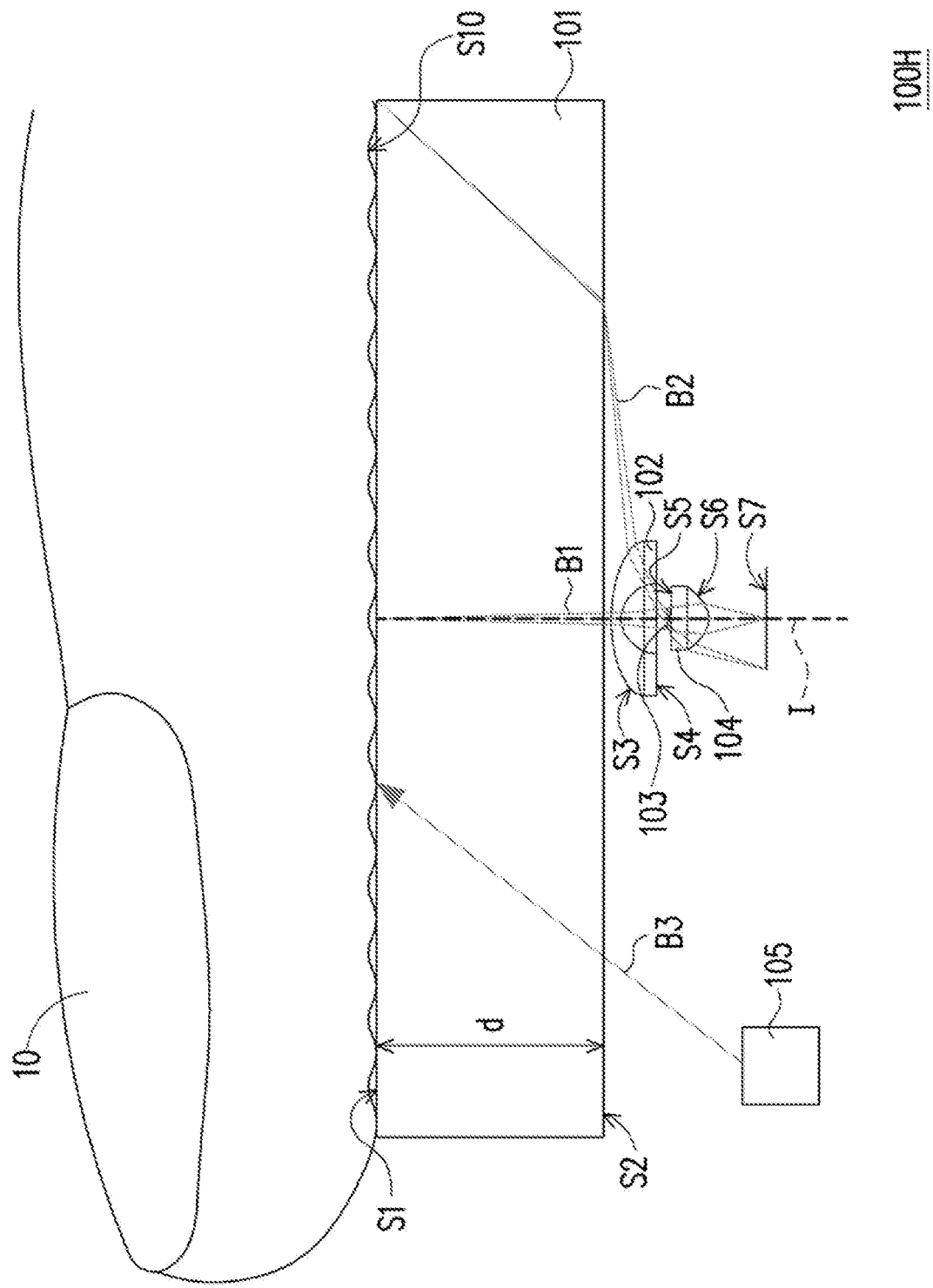
FIG. 17 is a schematic diagram of an image capturing apparatus according to a ninth embodiment of the disclosure.

FIG. 17 is a schematic diagram of an image capturing apparatus according to a ninth embodiment of the disclosure. Referring to FIG. 17, a difference between the image capturing apparatus 100H of the ninth embodiment and the image capturing apparatus 100 of FIG. 1 is that optical data, aspheric coefficients and parameters between these lens elements have some differences.

Detailed optical data of the ninth embodiment is shown in table twenty-five.

TABLE TWENTY-FIVE f = 0.174 mm, Fno = 2.04, HFOV = 72.5°, imgH = 0.4005 mm

| | surface | radius of curvature (mm) | distance (mm) | refractive index | dispersion coefficient | focal length (mm) |
|---|---|---|---|---|---|---|
| tested object 10 | surface S10 | | 0 | | | |
| cover plate 101 | object side surface S1 | infinity | 1.8 | 1.52 | 64.2 | |
| | image side surface S2 | infinity | 0.068 | | | |

TABLE TWENTY-FIVE-continued f = 0.174 mm, Fno = 2.04, HFOV = 72.5°, imgH = 0.4005 mm

| | surface | radius of curvature (mm) | distance (mm) | refractive index | dispersion coefficient | focal length (mm) |
|---|---|---|---|---|---|---|
| first lens element 102 | object side surface S3 | 1.254 | 0.075 | 1.674 | 21.5 | −0.448 |
| | image side surface S4 | 0.226 | 0.371 | | | |
| aperture 103 | | infinity | 0.05 | | | |
| second lens element 104 | object side surface S5 | 9.188 | 0.286 | 1.674 | 21.5 | 0.306 |
| | image side surface S6 | −0.202 | 0.452 | | | |
| imaging plane S7 | imaging plane S7 | infinity | | | | |

Various aspheric coefficients of the object side surfaces and the image side surfaces of the lens elements of the ninth embodiment in the equation (1) are as shown in table twenty-six.

TABLE TWENTY-THREE

| | lens | | | |
|---|---|---|---|---|
| | first lens element 102 | | second lens element 104 | |
| | surface | | | |
| | object side surface S3 | image side surface S4 | object side surface S5 | image side surface S6 |
| K | 3.019 | −0.324 | 2786.708 | −3.054 |
| $a_2$ | 0 | 0 | 0 | 0 |
| $a_4$ | 0.0575 | −0.08 | −49.339 | −28.023 |
| $a_6$ | 0.357 | 122.336 | 1757.430 | 224.583 |
| $a_8$ | 0.316 | −5902.073 | −4949.995 | −3752.568 |
| $a_{10}$ | −1.509 | 1.951E+004 | −2.046E+006 | 1.151E+004 |
| $a_{12}$ | −4.716 | 4.760E+005 | 2.763E+005 | 5.000E+005 |
| $a_{14}$ | 4.832 | 7.062+E006 | 1.253E+009 | −3.997E+006 |
| $a_{16}$ | 45.377 | −1.314+E008 | 7.512E+009 | −1.129E+008 |

Relationship of various important parameters in the ninth embodiment is shown in table twenty-seven.

TABLE TWENTY-SEVEN

| conditional expression | value |
|---|---|
| f/imgH | 0.436 |
| N1 + N2 | 3.348 |
| OTL (mm) | 3.102 |
| d (mm) | 1.8 |
| OTL − d (mm) | 1.302 |
| (OTL − d)/imgH | 3.251 |
| V1 + V2 | 43 |

TABLE TWENTY-SEVEN-continued

| conditional expression | value |
|---|---|
| \|f/f1\| + \|f/f2\| | 0.961 |
| FOV (degree) | 145 |

Figure 18A:
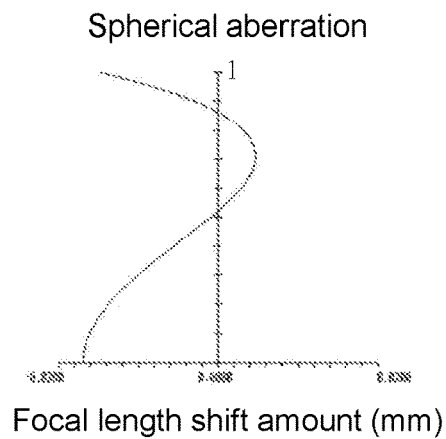
FIG. 18A to FIG. 18C are diagrams respectively illustrating a longitudinal spherical aberration and various aberrations of the image capturing apparatus of the ninth embodiment.
Figure 18B:
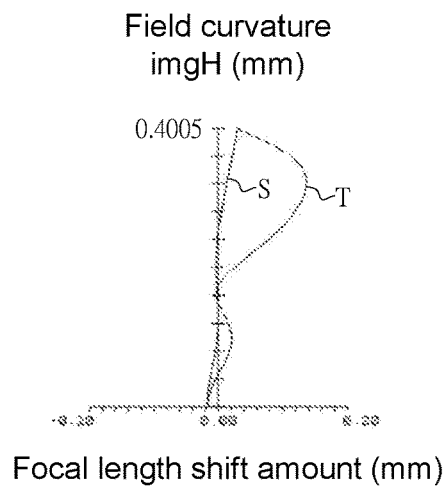
Figure 18C:
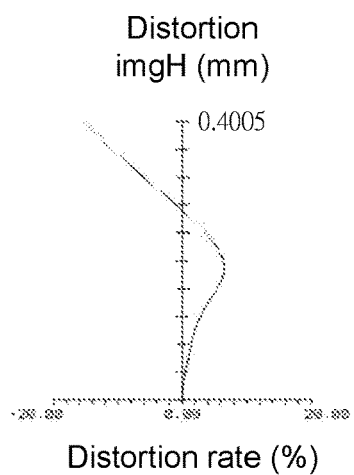

FIG. 18A to FIG. 18C are diagrams respectively illustrating a longitudinal spherical aberration and various aberrations of the image capturing apparatus of the ninth embodiment. FIG. 18A illustrates a longitudinal spherical aberration when a wavelength is 550 nm and a pupil radius is 0.0428 mm. FIG. 18B illustrates a field curvature aberration in a sagittal direction and a field curvature aberration in a tangential direction on the imaging plane S7 when the wavelength is 550 nm. FIG. 18C illustrates a distortion aberration on the imaging plane S7 when the wavelength is 550 nm. From FIG. 18A to FIG. 18C, it is learned that the image capturing apparatus 100H of the ninth embodiment may obviously mitigate the spherical aberration, effectively eliminate aberrations and maintain the distortion aberration within an imaging quality requirement. Therefore, the image capturing apparatus 100H of the ninth embodiment may provide good imaging quality while achieving the thinning effect (OTL is reduced to 3.102 mm).

Figure 19:
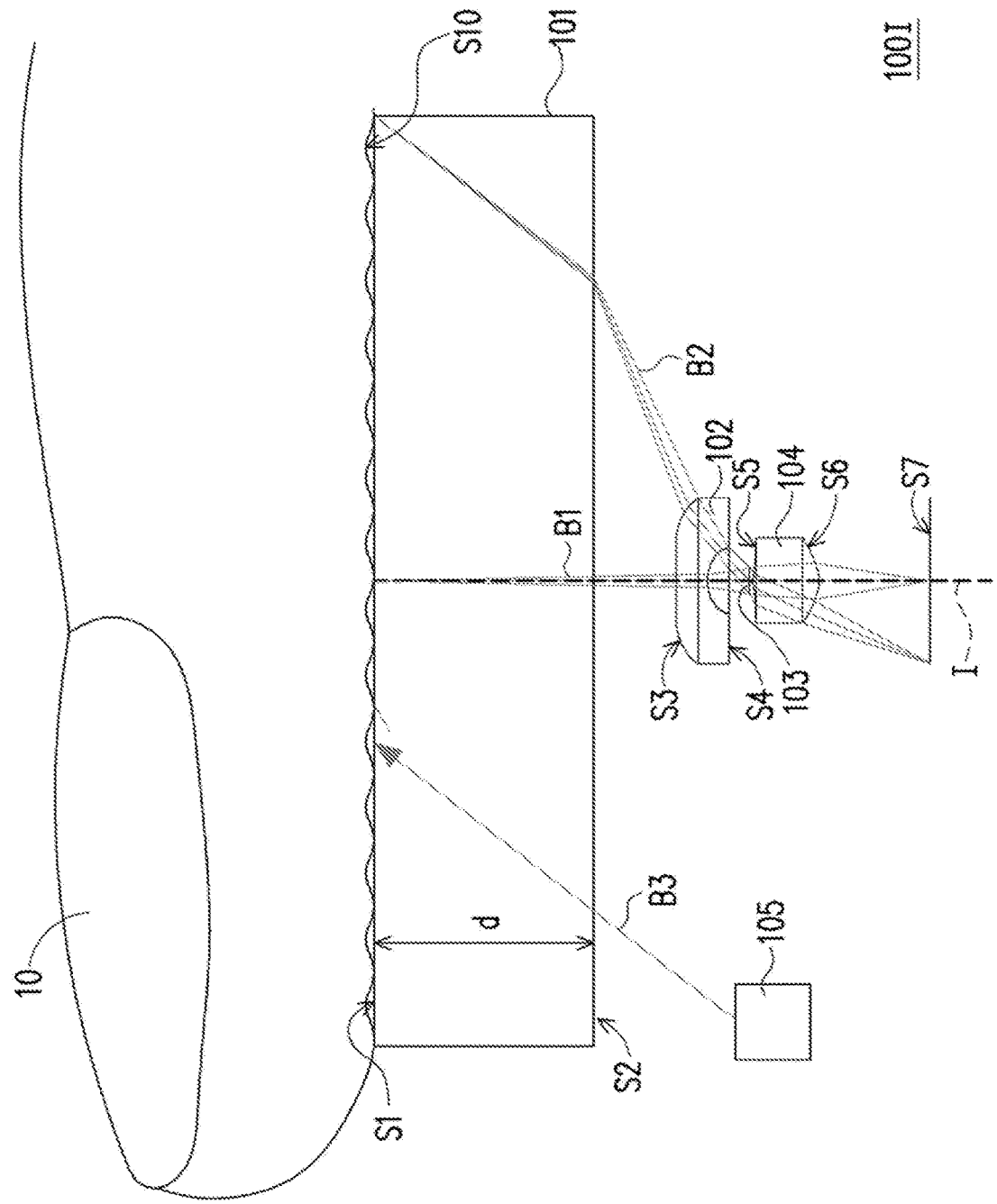
FIG. 19 is a schematic diagram of an image capturing apparatus according to a tenth embodiment of the disclosure.

FIG. 19 is a schematic diagram of an image capturing apparatus according to a tenth embodiment of the disclosure. Referring to FIG. 19, a difference between the image capturing apparatus 100I of the tenth embodiment and the image capturing apparatus 100 of FIG. 1 is that optical data, aspheric coefficients and parameters between these lens elements have some differences. Moreover, the object side surface S3 of the first lens element 102 is concave near the optical axis.

Detailed optical data of the tenth embodiment is shown in table twenty-eight.

TABLE TWENTY-EIGHT f = 0.38 mm, Fno = 2.47, HFOV = 61°, imgH = 0.7 mm

| | surface | radius of curvature (mm) | distance (mm) | refractive index | dispersion coefficient | focal length (mm) |
|---|---|---|---|---|---|---|
| tested object 10 | surface S10 | | 0 | | | |
| cover plate 101 | object side surface S1 | infinity | 1.800 | 1.52 | 64.2 | |
| | image side surface S2 | infinity | 0.698 | | | |

TABLE TWENTY-EIGHT-continued f = 0.38 mm, Fno = 2.47, HFOV = 61°, imgH = 0.7 mm

| | surface | radius of curvature (mm) | distance (mm) | refractive index | dispersion coefficient | focal length (mm) |
|---|---|---|---|---|---|---|
| first lens element 102 | object side surface S3 | −1.323 | 0.292 | 1.61 | 29.9 | −0.534 |
| | image side surface S4 | 0.472 | 0.392 | | | |
| aperture 103 | | infinity | 0.048 | | | |
| second lens element 104 | object side surface S5 | 1.281 | 0.477 | 1.64 | 21.5 | 0.528 |
| | image side surface S6 | −0.397 | 0.902 | | | |
| imaging plane S7 | imaging plane S7 | infinity | | | | |

Various aspheric coefficients of the object side surfaces and the image side surfaces of the lens elements of the tenth embodiment in the equation (1) are as shown in table twenty-nine.

TABLE TWENTY-NINE

| | lens | | | |
|---|---|---|---|---|
| | first lens element 102 | | second lens element 104 | |
| | surface | | | |
| | object side surface S3 | image side surface S4 | object side surface S5 | image side surface S6 |
| K | −1.82E+02 | 1.72E+00 | −8.44E+02 | −9.67E−01 |
| $a_2$ | 0 | 0 | 0 | 0 |
| $a_4$ | 1.27E+00 | 1.53E+01 | 1.46E+01 | 1.69E−01 |
| $a_6$ | −1.77E+00 | −7.96E+02 | −5.11E+02 | −8.61E+00 |
| $a_8$ | 2.17E+00 | 2.76E+04 | 9.66E+03 | 2.21E+02 |
| $a_{10}$ | −5.596E−01 | −4.85E+05 | −7.64E+04 | −1.10E+03 |
| $a_{12}$ | −5.57E−01 | 4.28E+06 | 1.27E+05 | −4.362E+03 |
| $a_{14}$ | 1.11E−01 | −1.43E+07 | 2.96E+05 | 6.16E+04 |
| $a_{16}$ | 5.75E−02 | 0.00E+00 | 0.00E+00 | −1.275E+05 |

Relationship of various important parameters in the tenth embodiment is shown in table thirty.

TABLE THIRTY

| conditional expression | value |
|---|---|
| f/imgH | 0.543 |
| N1 + N2 | 3.25 |
| OTL (mm) | 4.609 |
| d (mm) | 1.8 |
| OTL − d (mm) | 2.809 |
| (OTL − d)/imgH | 4.014 |

TABLE THIRTY-continued

| conditional expression | value |
|---|---|
| V1 + V2 | 51.4 |
| |f/f1| + |f/f2| | 1.434 |
| FOV (degree) | 122 |

Figure 20A:
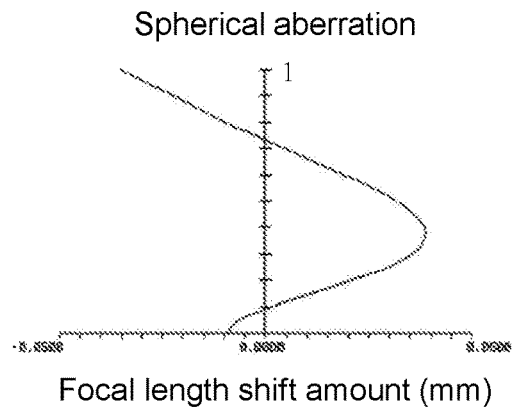
FIG. 20A to FIG. 20C are diagrams respectively illustrating a longitudinal spherical aberration and various aberrations of the image capturing apparatus of the tenth embodiment.
Figure 20B:
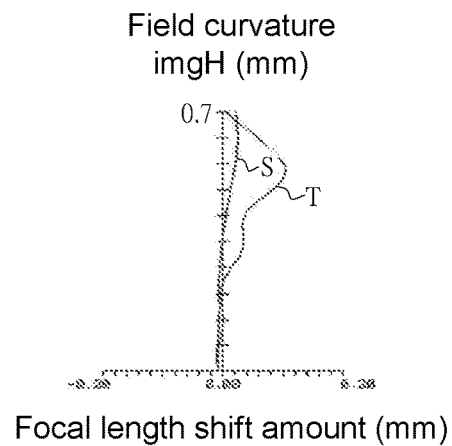
Figure 20C:
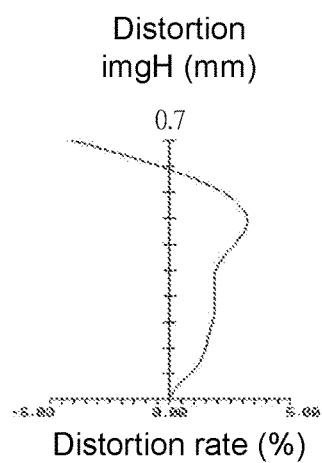

FIG. 20A to FIG. 20C are diagrams respectively illustrating a longitudinal spherical aberration and various aberrations of the image capturing apparatus of the tenth embodiment. FIG. 20A illustrates a longitudinal spherical aberration when a wavelength is 550 nm and a pupil radius is 0.0769 mm. FIG. 20B illustrates a field curvature aberration in a sagittal direction and a field curvature aberration in a tangential direction on the imaging plane S7 when the wavelength is 550 nm. FIG. 20C illustrates a distortion aberration on the imaging plane S7 when the wavelength is 550 nm. From FIG. 20A to FIG. 20C, it is learned that the image capturing apparatus 100I of the tenth embodiment may obviously mitigate the spherical aberration, effectively eliminate aberrations and maintain the distortion aberration within an imaging quality requirement. Therefore, the image capturing apparatus 100I of the tenth embodiment may provide good imaging quality while achieving the thinning effect (OTL is reduced to 4.609 mm).

Figure 21:
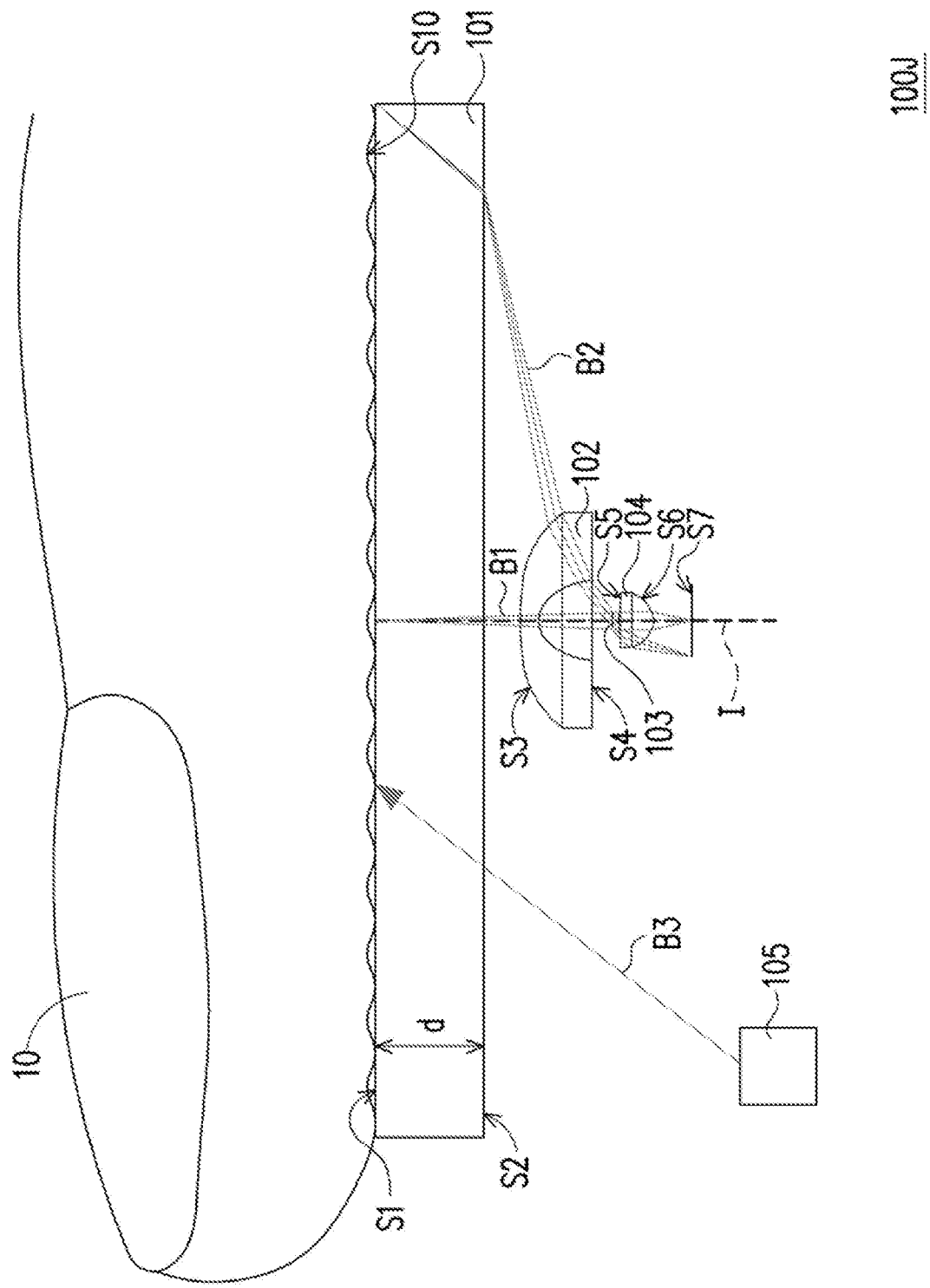
FIG. 21 is a schematic diagram of an image capturing apparatus according to an eleventh embodiment of the disclosure.

FIG. 21 is a schematic diagram of an image capturing apparatus according to an eleventh embodiment of the disclosure. Referring to FIG. 21, a difference between the image capturing apparatus 100J of the eleventh embodiment and the image capturing apparatus 100 of FIG. 1 is that optical data, aspheric coefficients and parameters between these lens elements have some differences.

Detailed optical data of the eleventh embodiment is shown in table thirty-one.

TABLE THIRTY-ONE f = 0.199 mm, Fno = 1.97, HFOV = 74.6°, imgH = 0.64 mm

| | surface | radius of curvature (mm) | distance (mm) | refractive index | dispersion coefficient | focal length (mm) |
|---|---|---|---|---|---|---|
| tested object 10 | surface S10 | | 0 | | | |
| cover plate 101 | object side surface S1 | infinity | 1.800 | 1.52 | 64.2 | |
| | image side surface S2 | infinity | 0.615 | | | |

TABLE THIRTY-ONE-continued f = 0.199 mm, Fno = 1.97, HFOV = 74.6°, imgH = 0.64 mm

| | surface | radius of curvature (mm) | distance (mm) | refractive index | dispersion coefficient | focal length (mm) |
|---|---|---|---|---|---|---|
| first lens element 102 | object side surface S3 | 8.682 | 0.298 | 1.64 | 21.5 | −0.689 |
| | image side surface S4 | 0.418 | 1.223 | | | |
| aperture 103 | | infinity | 0.154 | | | |
| second lens element 104 | object side surface S5 | 1.661 | 0.543 | 1.64 | 21.5 | 0.530 |
| | image side surface S6 | −0.376 | 0.633 | | | |
| imaging plane S7 | imaging plane S7 | infinity | | | | |

Various aspheric coefficients of the object side surfaces and the image side surfaces of the lens elements of the eleventh embodiment in the equation (1) are as shown in table thirty-two.

TABLE THIRTY-TWO

| | lens | | | |
|---|---|---|---|---|
| | first lens element 102 | | second lens element 104 | |
| | surface | | | |
| | object side surface S3 | image side surface S4 | object side surface S5 | image side surface S6 |
| K | 1.75E+01 | −9.05E−01 | −2.68E+02 | −5.92E−01 |
| $a_2$ | 0 | 0 | 0 | 0 |
| $a_4$ | 4.66E−02 | 8.72E−01 | −6.31E−01 | 8.61E−01 |
| $a_6$ | −6.94E−03 | −3.593E+00 | 4.10E+00 | −8.59E−01 |
| $a_8$ | 6.56E−04 | 8.90E+00 | −1.4872E+01 | 8.66E+00 |
| $a_{10}$ | 0.00E+00 | 0.00E+00 | 0.00E+00 | 0.00E+00 |
| $a_{12}$ | 0.00E+00 | 0.00E+00 | 0.00E+00 | 0.00E+00 |
| $a_{14}$ | 0.00E+00 | 0.00E+00 | 0.00E+00 | 0.00E+00 |
| $a_{16}$ | 0.00E+00 | 0.00E+00 | 0.00E+00 | 0.00E+00 |

Relationship of various important parameters in the eleventh embodiment is shown in thirty-three.

TABLE THIRTY-THREE

| conditional expression | value |
|---|---|
| f/imgH | 0.311 |
| N1 + N2 | 3.28 |
| OTL (mm) | 5.266 |
| d (mm) | 1.8 |
| OTL − d (mm) | 3.466 |
| (OTL − d)/imgH | 5.406 |

TABLE THIRTY-THREE-continued

| conditional expression | value |
|---|---|
| V1 + V2 | 43 |
| |f/f1| + |f/f2| | 0.664 |
| FOV (degree) | 149.2 |

Figure 22A:
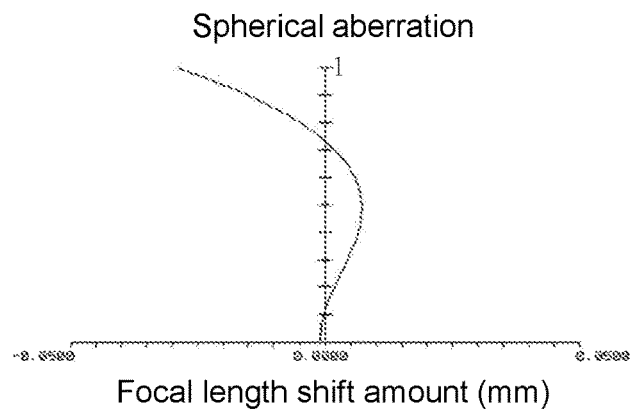
FIG. 22A to FIG. 22C are diagrams respectively illustrating a longitudinal spherical aberration and various aberrations of the image capturing apparatus of the eleventh embodiment.
Figure 22B:
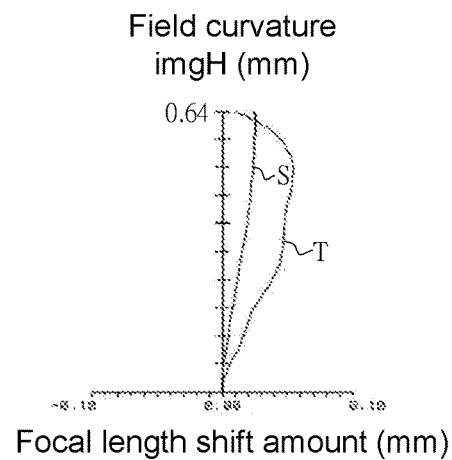
Figure 22C:
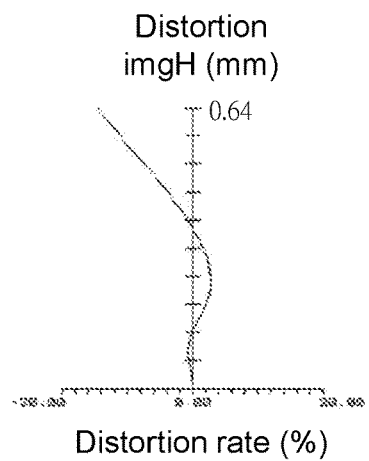

FIG. 22A to FIG. 22C are diagrams respectively illustrating a longitudinal spherical aberration and various aberrations of the image capturing apparatus of the eleventh embodiment. FIG. 22A illustrates a longitudinal spherical aberration when a wavelength is 550 nm and a pupil radius is 0.0507 mm. FIG. 22B illustrates a field curvature aberration in a sagittal direction and a field curvature aberration in a tangential direction on the imaging plane S7 when the wavelength is 550 nm. FIG. 22C illustrates a distortion aberration on the imaging plane S7 when the wavelength is 550 nm. From FIG. 22A to FIG. 22C, it is learned that the image capturing apparatus 100J of the eleventh embodiment may obviously mitigate the spherical aberration, effectively eliminate aberrations and maintain the distortion aberration within an imaging quality requirement. Therefore, the image capturing apparatus 100J of the eleventh embodiment may provide good imaging quality while achieving the thinning effect (OTL is reduced to 5.266 mm).

Figure 23:
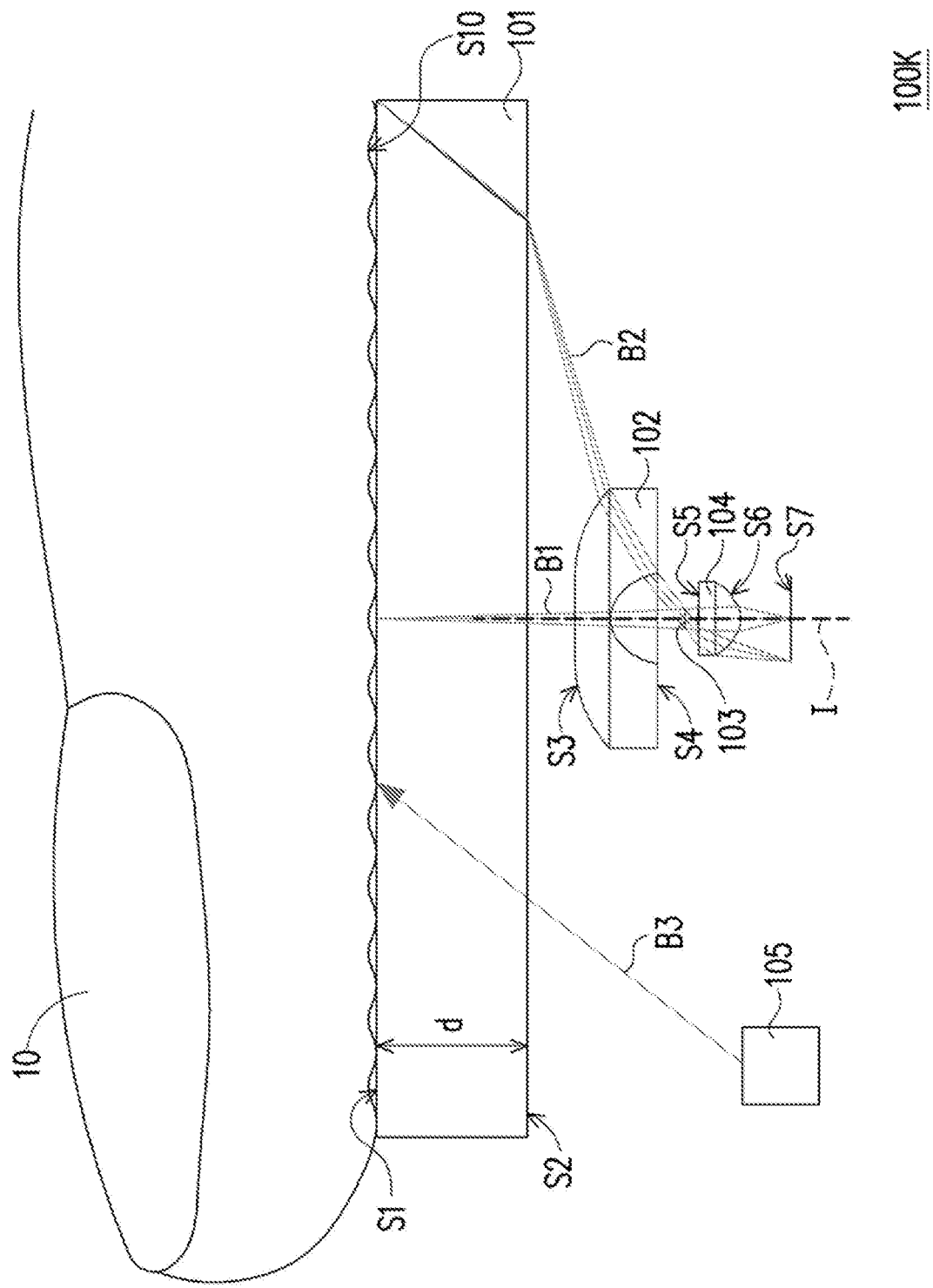
FIG. 23 is a schematic diagram of an image capturing apparatus according to a twelfth embodiment of the disclosure.

FIG. 23 is a schematic diagram of an image capturing apparatus according to a twelfth embodiment of the disclosure. Referring to FIG. 23, a difference between the image capturing apparatus 100K of the twelfth embodiment and the image capturing apparatus 100 of FIG. 1 is that optical data, aspheric coefficients and parameters between these lens elements have some differences.

Detailed optical data of the twelfth embodiment is shown in table thirty-four.

TABLE THIRTY-FOUR f = 0.210 mm, Fno = 1.96, HFOV = 69.5°, imgH = 0.54 mm

| | surface | radius of curvature (mm) | distance (mm) | refractive index | dispersion coefficient | focal length (mm) |
|---|---|---|---|---|---|---|
| tested object 10 | surface S10 | | 0 | | | |
| cover plate 101 | object side surface S1 | infinity | 1.800 | 1.52 | 64.2 | |
| | image side surface S2 | infinity | 0.590 | | | |

TABLE THIRTY-FOUR-continued f = 0.210 mm, Fno = 1.96, HFOV = 69.5°, imgH = 0.54 mm

| | surface | radius of curvature (mm) | distance (mm) | refractive index | dispersion coefficient | focal length (mm) |
|---|---|---|---|---|---|---|
| first lens element 102 | object side surface S3 | 77.653 | 0.444 | 1.64 | 21.5 | −0.626 |
| | image side surface S4 | 0.401 | 0.890 | | | |
| aperture 103 | | infinity | 0.159 | | | |
| second lens element 104 | object side surface S5 | 1.358 | 0.516 | 1.64 | 21.5 | 0.491 |
| | image side surface S6 | −0.353 | 0.604 | | | |
| imaging plane S7 | imaging plane S7 | infinity | | | | |

Various aspheric coefficients of the object side surfaces and the image side surfaces of the lens elements of the twelfth embodiment in the equation (1) are as shown in table thirty-five.

TABLE THIRTY-FIVE

| | lens | | |
|---|---|---|---|
| first lens element 102 | | second lens element 104 | |
| surface | | | |
| object side surface S3 | image side surface S4 | object side surface S5 | image side surface S6 |
| K | 8.05E+02 | −8.23E−01 | −2.02E+02 | −5.57E−01 |
| $a_2$ | 0 | 0 | 0 | 0 |
| $a_4$ | 6.81E−02 | 5.40E−01 | −1.77E−01 | 1.21E+00 |
| $a_6$ | −2.56E−03 | −4.578E+00 | 1.48E+00 | −1.44E−01 |
| $a_8$ | −1.25E−04 | 1.28E+01 | −1.462E+01 | 1.58E+01 |
| $a_{10}$ | −1.27E−04 | 2.51E+01 | 4.82E+00 | −3.42E+00 |
| $a_{12}$ | 1.02E−05 | 8.87E+01 | −2.962E+01 | −6.758E+00 |
| $a_{14}$ | 7.58E−06 | 2.57E+01 | −5.524E+02 | 3.18E+00 |
| $a_{16}$ | −1.49E−07 | −9.375E+02 | 2.61E+03 | 2.29E+02 |

Relationship of various important parameters in the twelfth embodiment is shown in thirty-sixth.

TABLE THIRTY-SIX

| conditional expression | value |
|---|---|
| f/imgH | 0.389 |
| N1 + N2 | 3.28 |
| OTL (mm) | 5.003 |
| d (mm) | 1.8 |
| OTL − d (mm) | 3.203 |
| (OTL − d)/imgH | 5.926 |
| V1 + V2 | 43 |
| |f/f1| + |f/f2| | 0.763 |
| FOV (degree) | 139 |

Figure 24A:
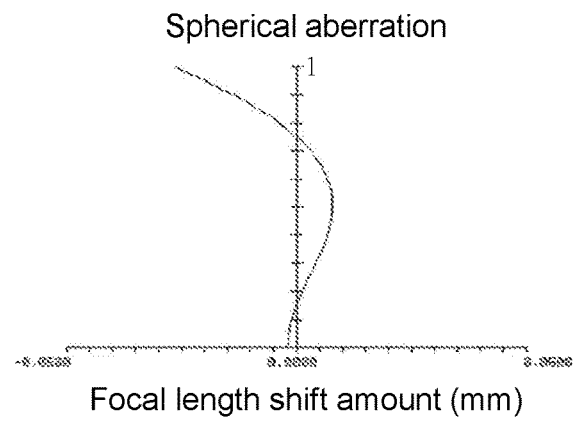
FIG. 24A to FIG. 24C are diagrams respectively illustrating a longitudinal spherical aberration and various aberrations of the image capturing apparatus of the twelfth embodiment.
Figure 24B:
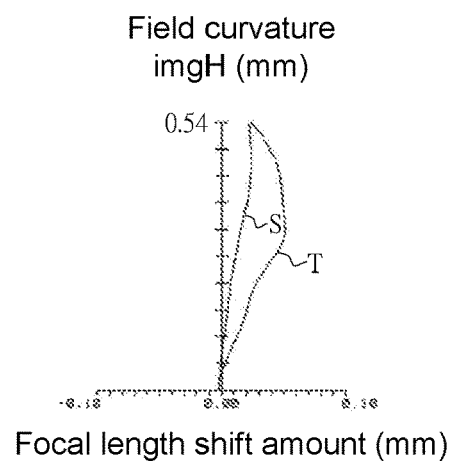
Figure 24C:
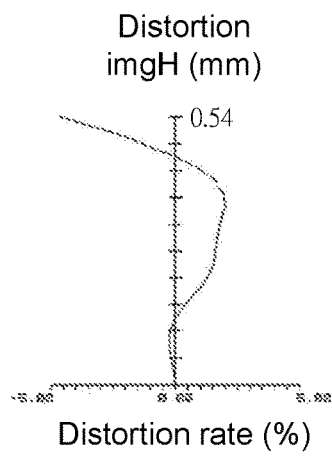

FIG. 24A to FIG. 24C are diagrams respectively illustrating a longitudinal spherical aberration and various aberrations of the image capturing apparatus of the twelfth embodiment. FIG. 24A illustrates a longitudinal spherical aberration when a wavelength is 550 nm and a pupil radius is 0.0537 mm. FIG. 24B illustrates a field curvature aberration in a sagittal direction and a field curvature aberration in a tangential direction on the imaging plane S7 when the wavelength is 550 nm. FIG. 24C illustrates a distortion aberration on the imaging plane S7 when the wavelength is 550 nm. From FIG. 24A to FIG. 24C, it is learned that the image capturing apparatus 100K of the twelfth embodiment may obviously mitigate the spherical aberration, effectively eliminate aberrations and maintain the distortion aberration within an imaging quality requirement. Therefore, the image capturing apparatus 100K of the twelfth embodiment may provide good imaging quality while achieving the thinning effect (OTL is reduced to 5.003 mm).

In various embodiments of the disclosure, considering manufacturing difficulty, manufacturing cost, overall thickness and imaging quality, if at least one of the following conditional expressions is satisfied, a better setting is achieved.

0.2<f/imgH<0.9;

2.9<N1+N2<3.7;

2<(OTL−d)/imgH<8;

Fno<3.7;

(OTL−d)<3.5 mm;

35<V1+V2<65;

0.6<|f/f1|+|f/f2|<1.7;

100 degrees<FOV<180 degrees; and a distance from the second lens 104 to the imaging plane S7 on the optical axis I is greater than or equal to 0.4 mm.

In detail, by satisfying 0.2<f/imgH<0.9, it avails collecting large angle light beams, so that the image capturing apparatus may capture a larger image range within a short distance. By satisfying 2.9<N1+N2<3.7, it avails reducing a volume of the image capering apparatus, so as to achieving the thinning effect. By satisfying at least one of 2<(OTL−d)/imgH<8 and (OTL−d)<3.5 mm, the thinning effect is achieved. By satisfying Fno<3.7, a larger aperture is achieved. In this way, under an environment with insufficient light, good imaging effect is also achieved. By satisfying 35<V1+V2<65, it avails correcting color aberration. By satisfying 0.6<|f/f1|+|f/f2|<1.7, besides aberrations are modified, sensitivity of the optical system is also reduced. By satisfying 100 degrees<FOV<180 degrees, a required image capturing range is acquired, so as to properly control a distortion degree.

Regarding unpredictability of optical system design, under the framework of the disclosure, by satisfying at least one of the above-mentioned conditional expressions, the thickness of the image capturing apparatus is reduced, an applicable aperture is increased, the imaging quality is improved or an assembly yield is enhanced to mitigate the disadvantages of the prior art.

In summary, the image capturing apparatus of the embodiments of the disclosure have at least one of following advantages:

1. It is easier to achieve the thinning effect by using two lens elements to capture the light beam reflected by the tested object than capturing the light beam reflected by the tested object by more than two lens elements. For example, in various embodiments of the disclosure, the distances (OTL) between the tested object and the imaging plane on the optical axis are all smaller than 5.3 mm.

2. The object side surfaces and the image side surfaces of the two lens elements all adopt aspherical design, which avails reducing the aberrations, so as to reduce the number of the required lens elements to two.

3. The distance from the image side surface of the second lens element to the imaging plane on the optical axis is greater than or equal to 0.4 mm. In this way, components/film layers such as a filter element may be disposed between the second lens element and the imaging plane according to an actual requirement, but the disclosure is not limited thereto.

4. The aperture may be selectively configured to reduce the stray light, so as to improve the image quality. In an embodiment, by disposing the aperture between the first lens element and the second lens element, it avails increasing the FOV, so that the image capturing apparatus has the advantage of a wide-angle lens.

5. The longitudinal spherical aberrations, the field curvature aberrations and the distortion aberrations of various embodiments of the disclosure are all complied with a usage specification.

6. In the aforementioned exemplary conditional expressions, value ranges within the maximum values/minimum values may all be applicable. It may also arbitrarily and selectively combine an uncertain number of exemplary conditional expressions for applying to the implementations of the disclosure.

It will be apparent to those skilled in the art that various modifications and variations can be made to the disclosed embodiments without departing from the scope or spirit of the disclosure. In view of the foregoing, it is intended that the disclosure covers modifications and variations provided they fall within the scope of the following claims and their equivalents.

What is claimed is:

1. An image capturing apparatus, comprising a cover plate, a first lens element and a second lens element arranged sequentially from an object side to an image side along an optical axis, wherein the number of lens elements in the image capturing apparatus is only two, and the image capturing apparatus satisfies:

$0.2 < f/imgH < 0.9;$ $2.9 < N1 + N2 < 3.7;$ and $2 < (OTL-d)/imgH < 8,$ wherein f is an effective focal length of the image capturing apparatus, imgH is a maximum imaging height of the image capturing apparatus, N1 is a refractive index of the first lens element, N2 is a refractive index of the second lens element, OTL is a distance from a tested object to an imaging plane on the optical axis, and d is a thickness of the cover plate.

2. The image capturing apparatus as claimed in claim 1, wherein the first lens element and the second lens element respectively have a negative refractive power and a positive refractive power, the first lens element and the second lens element each have an object side surface and an image side surface, and the object side surface of the first lens element, the image side surface of the first lens element, the object side surface of the second lens element and the image side surface of the second lens surface are all aspheric surfaces, and the image capturing apparatus further comprises:

an aperture located between the first lens element and the second lens element.

3. The image capturing apparatus as claimed in claim 1, wherein an f-number of the image capturing apparatus is smaller than 3.7.

4. The image capturing apparatus as claimed in claim 1, wherein the image capturing apparatus further satisfies:

$(OTL-d) < 3.5$ mm.

5. The image capturing apparatus as claimed in claim 1, wherein the image capturing apparatus further satisfies:

$35 < V1 + V2 < 65,$ wherein V1 is a dispersion coefficient of the first lens element, and V2 is a dispersion coefficient of the second lens element.

6. The image capturing apparatus as claimed in claim 1, wherein the image capturing apparatus further satisfies:

$0.6 < |f/f1| + |f/f2| < 1.7,$ wherein f1 is a focal length of the first lens element, and f2 is a focal length of the second lens element.

7. The image capturing apparatus as claimed in claim 1, wherein the image capturing apparatus further satisfies:

$100$ degrees $< FOV < 180$ degrees, wherein FOV is a field of view of the image capturing apparatus.

8. The image capturing apparatus as claimed in claim 1, wherein a distance from the image side surface of the second lens element to the imaging plane on the optical axis is greater than or equal to 0.4 mm.

9. The image capturing apparatus as claimed in claim 1, further comprising:

a light source, disposed under the cover plate, and a wavelength of the light source is between 400 nm and 600 nm.

10. The image capturing apparatus as claimed in claim 1, wherein the cover plate comprises a finger pressing plate, a display panel, a touch display panel or a combination of at least two of the above.

* * * * *